United States Patent [19]
Kishi et al.

[11] Patent Number: 4,569,014
[45] Date of Patent: * Feb. 4, 1986

[54] METHOD OF CREATING A CURVED SURFACE

[75] Inventors: Hajimu Kishi, Hino; Masaki Seki, Takaidonishi, both of Japan

[73] Assignee: Fanuc Ltd., Minamitsuru, Japan

[*] Notice: The portion of the term of this patent subsequent to Jan. 1, 2002 has been disclaimed.

[21] Appl. No.: 669,835

[22] Filed: Nov. 9, 1984

Related U.S. Application Data

[63] Continuation of Ser. No. 266,284, May 22, 1981, Pat. No. 4,491,906.

[30] Foreign Application Priority Data

Jun. 10, 1980 [JP] Japan .................. 55-78247

[51] Int. Cl.4 ............... G06F 15/32; G06F 15/46
[52] U.S. Cl. .................. 364/191; 364/167
[58] Field of Search .......... 364/200, 900, 167, 168, 364/191, 520, 521, 522

[56] References Cited

U.S. PATENT DOCUMENTS 3,450,865  6/1969  Peras .................. 364/520
3,524,978  8/1970  Miura et al. .......... 364/520
4,010,356  3/1977  Evans et al. ......... 364/191 X

FOREIGN PATENT DOCUMENTS 1494849  8/1967  France ................. 364/520

OTHER PUBLICATIONS

Simon: "A Sculptured-Surface Program", Machine Design, vol. 46, Aug. 8, 1974, pp. 117-121.
Bezier: "Definition Numerique ales Courbes et Surfaces", Automatisme (Paris-France), vol. 12, No. 1—Jan. 1967, pp. 17-21.

Primary Examiner—Felix D. Gruber
Attorney, Agent, or Firm—Staas & Halsey

[57] ABSTRACT

A method of creating the curved surface of a body including steps of generating a plurality of intermediate sections and finding a section curve in each of the intermediate sections, in accordance with predetermined rules, from section data specifying given sections of the body and from data specifying sections curves in respective ones of the given sections, and generating the curved surface of the body from a collection of intermediate section curves in the general intermediate sections.

48 Claims, 42 Drawing Figures

Fig. 3
(A)
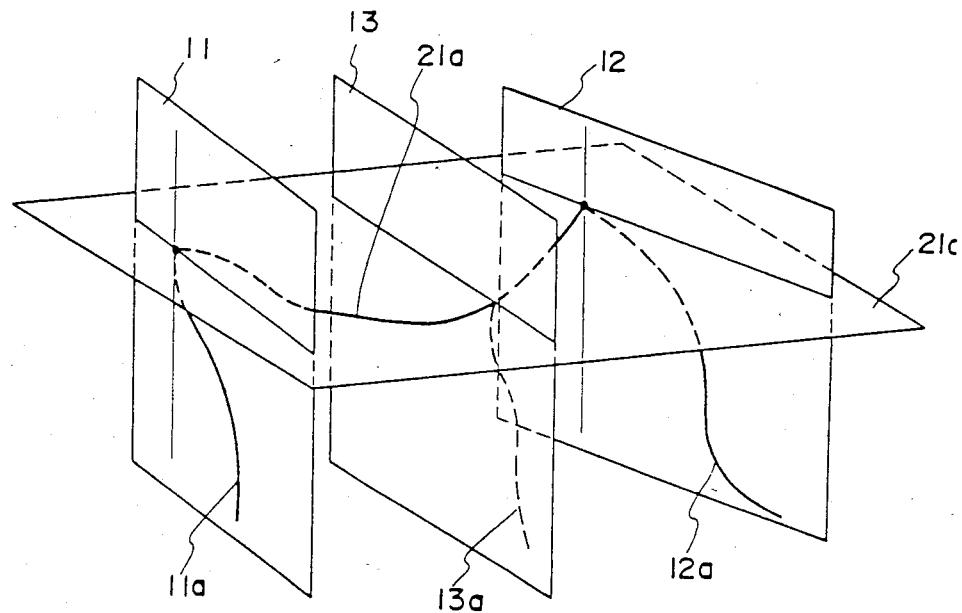
(B)
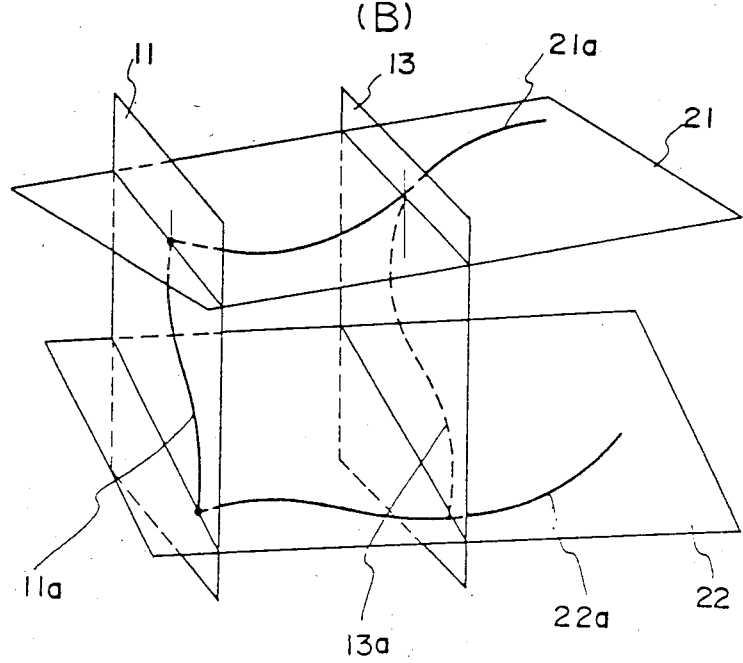

(C)

Fig. 11
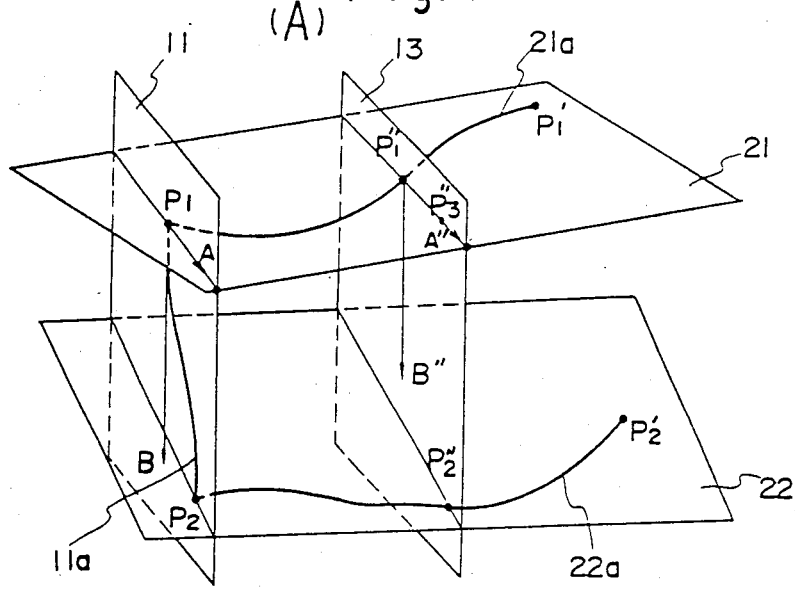
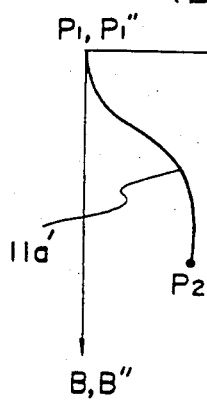
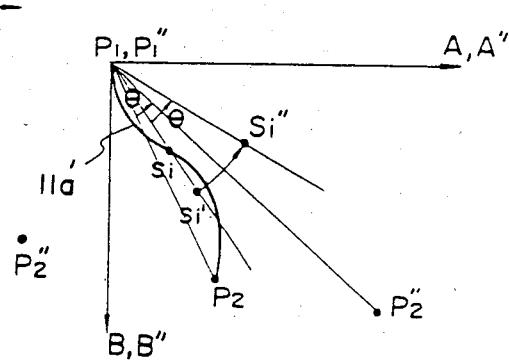
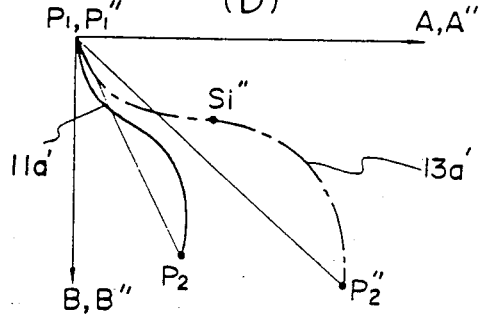

(E)

Fig. 12
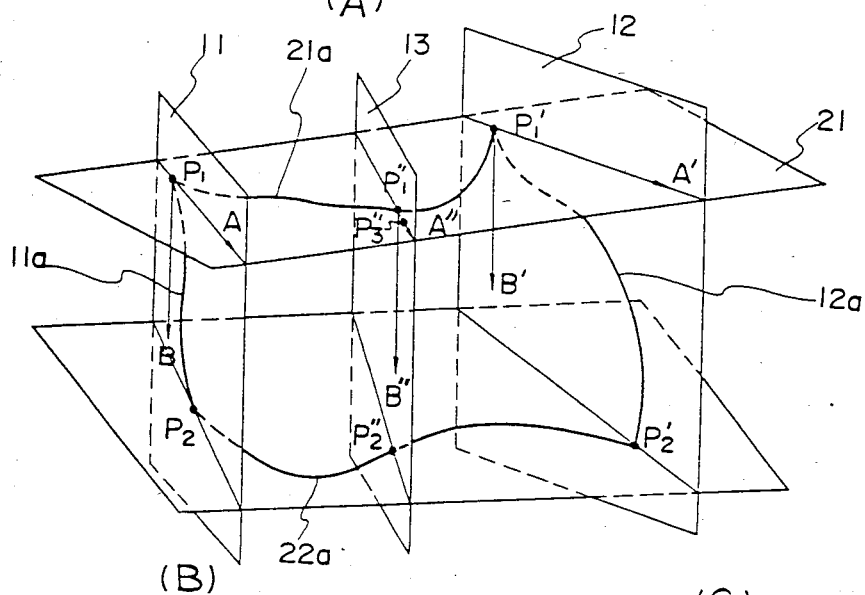
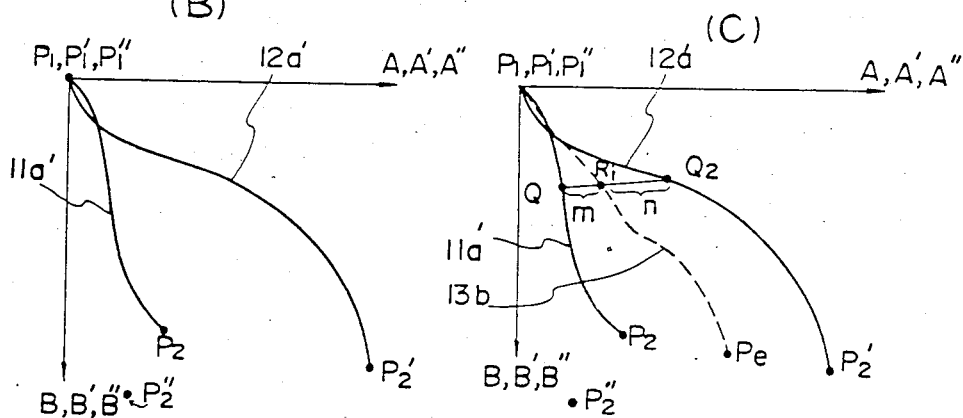
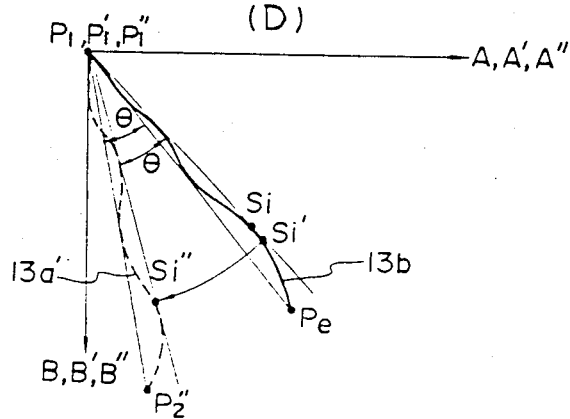

(E)

(A)

(B)

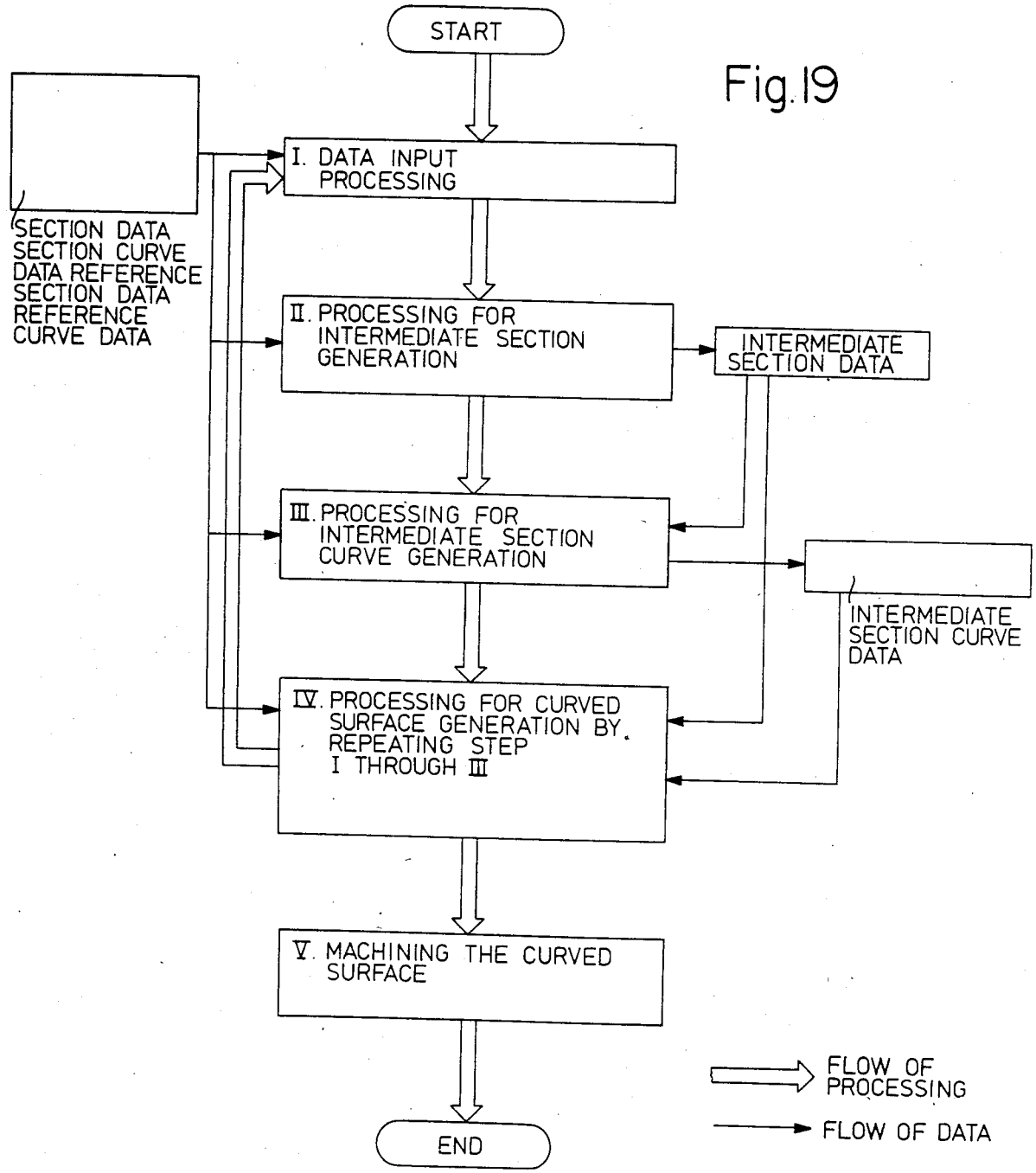

METHOD OF CREATING A CURVED SURFACE

This is a continuation of co-pending application Ser. No. 266,284 filed on May 22, 1981 now U.S. Pat. No. 4,491,906.

BACKGROUND OF THE INVENTION

This invention relates to a method of creating a curved surface of a three-dimensional body, and more particularly to a method of the type described that is ideal for the preparation of a numerical control tape required for the numerically controlled machining of a three-dimensional metal mold or the like.

A curved surface of a three-dimensional metal mold or the like, when drawn out on the plane of a blueprint is generally represented by a plurality of given section curves, but no data is shown for the shapes of the areas lying between the adjacent given section curves. When machining the workpiece in accordance with the numerical control method, however, it is essential that the adjacent section curves should be connected smoothly despite the absence of the data indicating the shape of the surface between them. In other words, this means that machining must be performed by generating the curved surface lying between the adjacent section curves from such data as that indicative of the given section curves, punching a numerical control (NC) tape so as to include the data concerning the generated curved surface, and then machining the workpiece in accordance with the instructions on the NC tape. To this end, the NC tape ordinarily is prepared by using a computer, and either of two systems can be adopted to create the desired curved surfaces. The first is a batch system in which processing is effected by dividing a curved surface into minute portions. In the second system a two-dimensional curve made up of straight lines and arcs is modified for each minute displacement applied to a third axis, i.e. the axis of the third dimension. The first system, however, entails the processing of large quantities of data as well as highly complicated mathematical processing, and requires a largescale computer system. The second system makes processing with a small scale computer possible, but there is no three-dimensional tool offset capability and an excessive limitation upon tool movement direction and machining shape, making it impossible to create sophisticated three-dimensional bodies.

SUMMARY OF THE INVENTION

Accordingly, it is an object of the present invention to provide a novel method of creating curved surfaces that allows sophisticated three-dimensional bodies to be readily created while permitting processing to be performed by a small-scale computer.

Another object of the present invention is to provide a method of creating curved surfaces through which it is possible to create an entire body from data indicative of the shapes of sections drawn out on a blueprint, of a part of the three-dimensional body such as a metal mold.

A further object of the present invention is to provide a method of creating curved surfaces smoothly and accurately.

Yet another object of the present invention is to provide a method of creating curved surfaces through which machining can be performed accurately on the basis of the created curved surfaces.

BRIEF DESCRIPTION OF THE DRAWINGS

FIG. 19 is a flowchart for the sections of processing performed by the present invention.

DESCRIPTION OF THE PREFERRED EMBODIMENTS

A curved surface when drawn out on the plane of a blueprint of a three-dimensional metal mold or the like is generally represented by a plurality of section curves, and there is no data given for the shapes of the areas lying between a certain section curve and the adjacent section curve. In effecting numerically controlled machining it is required that a metal mold be machined so as to smoothly connect these two section curves despite the absence of the data indicating the shape of the surface lying between the two section curves. In other words, machining must be performed by creating or generating the surface lying between the two section curves from such data as that indicative of the given section curves, punching the data relating to the generated surface into an NC tape, and then machining the metal mold as specified by the instructions on the NC tape.

Figure 1:
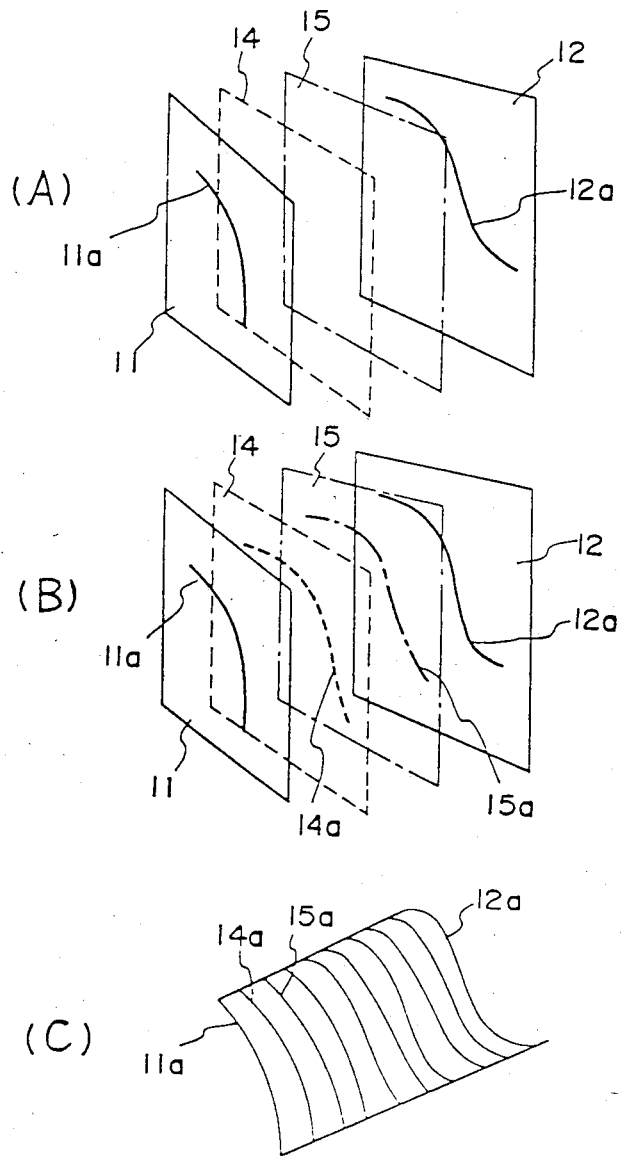
FIG. 1, composed of (A) (B) and (C) is a diagram useful in describing the creation of a curved surface according to the present invention.

Reference will first be had to FIG. 1 to describe the creation of the above-mentioned surface in accordance with the present invention. The steps are:

(1) generating a plurality of intermediate sections 14 and 15 between two given sections 11 and 12, as shown in FIG. 1A;

(2) generating intermediate section curves 14a, 15a . . ., lying in respective ones of the intermediate sections generated in step (1), from section curves (referred to as "given" section curves) 11a and 12a that lie in the given sections 11 and 12, respectively, as shown in FIG. 1B; and (3) generating the curved surface in the form of a continuous series of intermediate section curves upon finding the intermediate section curves 14a, 15a, . . . in a number of intermediate sections, as shown in FIG. 1C.

The method of the present invention is therefore based upon generating both intermediate sections and intermediate section curves which lie in the intermediate sections.

Figure 2:
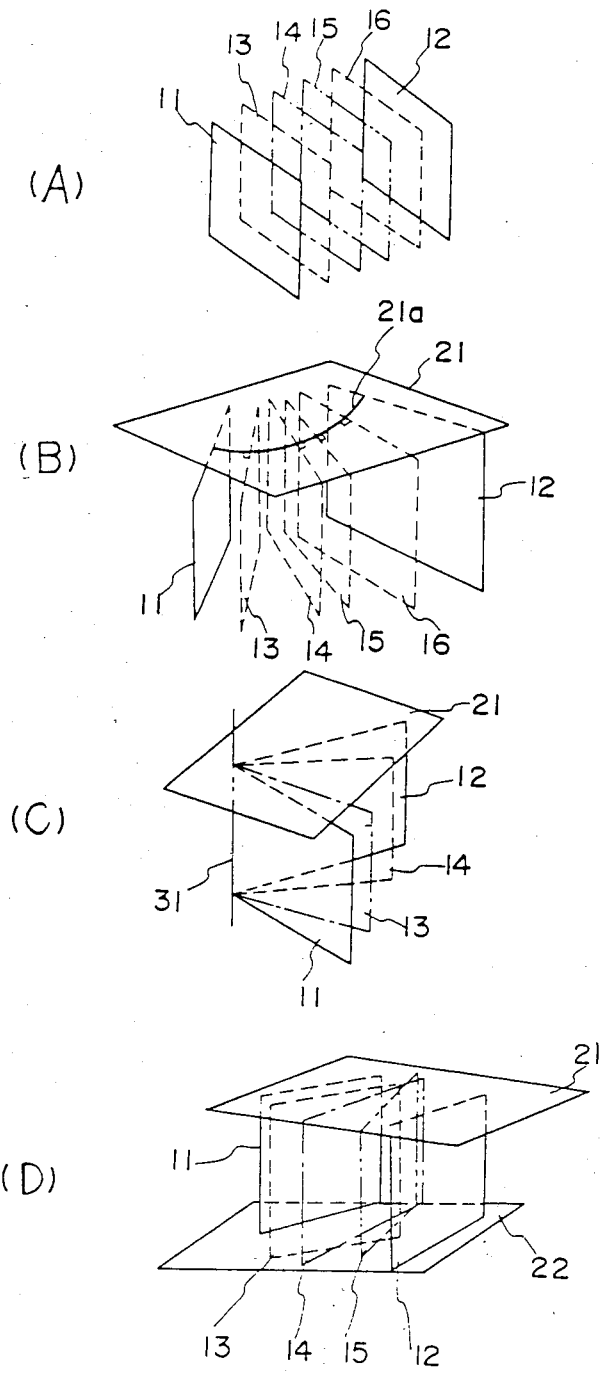
FIG. 2, composed of (A), (B), (C) and (D) is a diagram useful in describing the generation of intermediate sections according to the present invention.

There are four methods of generating intermediate sections in accordance with the given sections and given section curves drawn out on the plane of a blueprint. The four methods, illustrated in FIG. 2, are as follows:

(1) generating intermediate sections 13, 14, 15 and 16 in such a manner that they lie in parallel with given sections 11, 12 (referred to as a first method of generating intermediate sections as shown in FIG. 2A);

(2) generating intermediate sections 13, 14, 15 and 16 in such a manner that they lie perpendicular to a given reference section 21 and, at the same time, to a reference curve 21a which is a given section curve that specifies the external form of the curved body (referred to as a second method of generating intermediate sections as shown in FIG. 2B);

(3) generating intermediate sections 13, 14 . . . in such a manner that they lie perpendicular to the given reference section 21 and at the same time pass through a straight line 31 which is perpendicular to the reference section 21, the straight line 31 serving as an axis from which the intermediate sections 13, 14 . . . radiate (referred to as a third method of generating intermediate sections as shown in FIG. 2C); and (4) generating intermediate sections 13, 14, 15 . . . in such a manner that they lie perpendicular to one of two given reference sections 21 and 22 (referred to as a fourth method of generating intermediate sections as shown in FIG. 2D).

Figure 3:
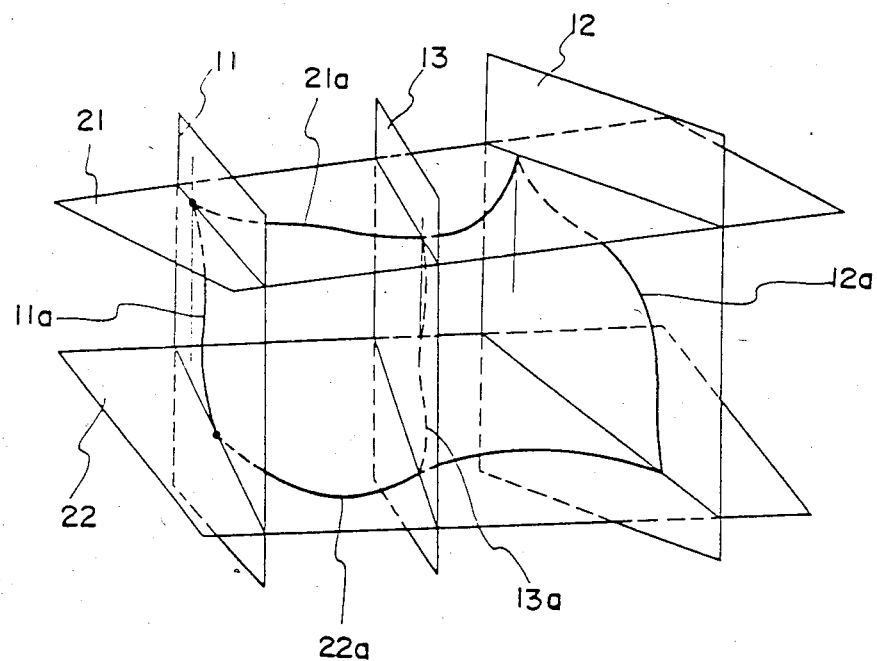
FIG. 3, composed of (A), (B) and (C) is a diagram useful in describing the generation of a intermediate section curve according to the present invention.

Furthermore, there are three methods of generating intermediate section curves in accordance with the given section curves similarly drawn out on the plane of the blueprint. The three methods, illustrated in FIG. 3, are as follows:

(1) generating an intermediate section curve 13a in the intermediate section 13 from the two given section curves 11a and 12a and one reference curve 21a (referred to as a first method of generating intermediate section curves as shown in FIG. 3A);

(2) generating the intermediate section curve 13a in the intermediate section 13 from one section curve 11a and two reference curves 21a and 22a (referred to as a second method of generating intermediate section curves as shown in FIG. 3B); and (3) generating the intermediate section curve 13a in the intermediate section 13 from the two given section curves 11a and 12a and two reference curves 21a and 22a (referred to as a third method of generating intermediate section curves as shown in FIG. 3C).

The foregoing is a general description of the inventive method of creating curved surfaces. With this as a background, the present invention will now be described in greater detail.

The present invention generates surfaces from a plurality of given section curves, there being classified into "reference curves" and "section curves" depending on differences in their manner of use. Specifically, a "section curve" is a given curve upon which the generation of an "intermediate section curve" is based when creating a curved surface. A "reference curve" is a given curve utilized to decide the special position of an intermediate section and to determine the shape of an intermediate section curve. The plane which contains the reference curve is referred to as a "reference section", and that which contains the section curve as a "section".

When creating a curved surface, a processor, which will be described later, must be supplied with input data, specifically section data relating to the sections and reference sections represented on the plane of a blueprint, and section curve data relating to the section curves and reference curves which are also drawn out on the blueprint. A data input method in accordance with the present invention will now be described assuming that the curved surface to be created is the curved surface $SS_1$ shown in FIG. 4A.

Figure 4:
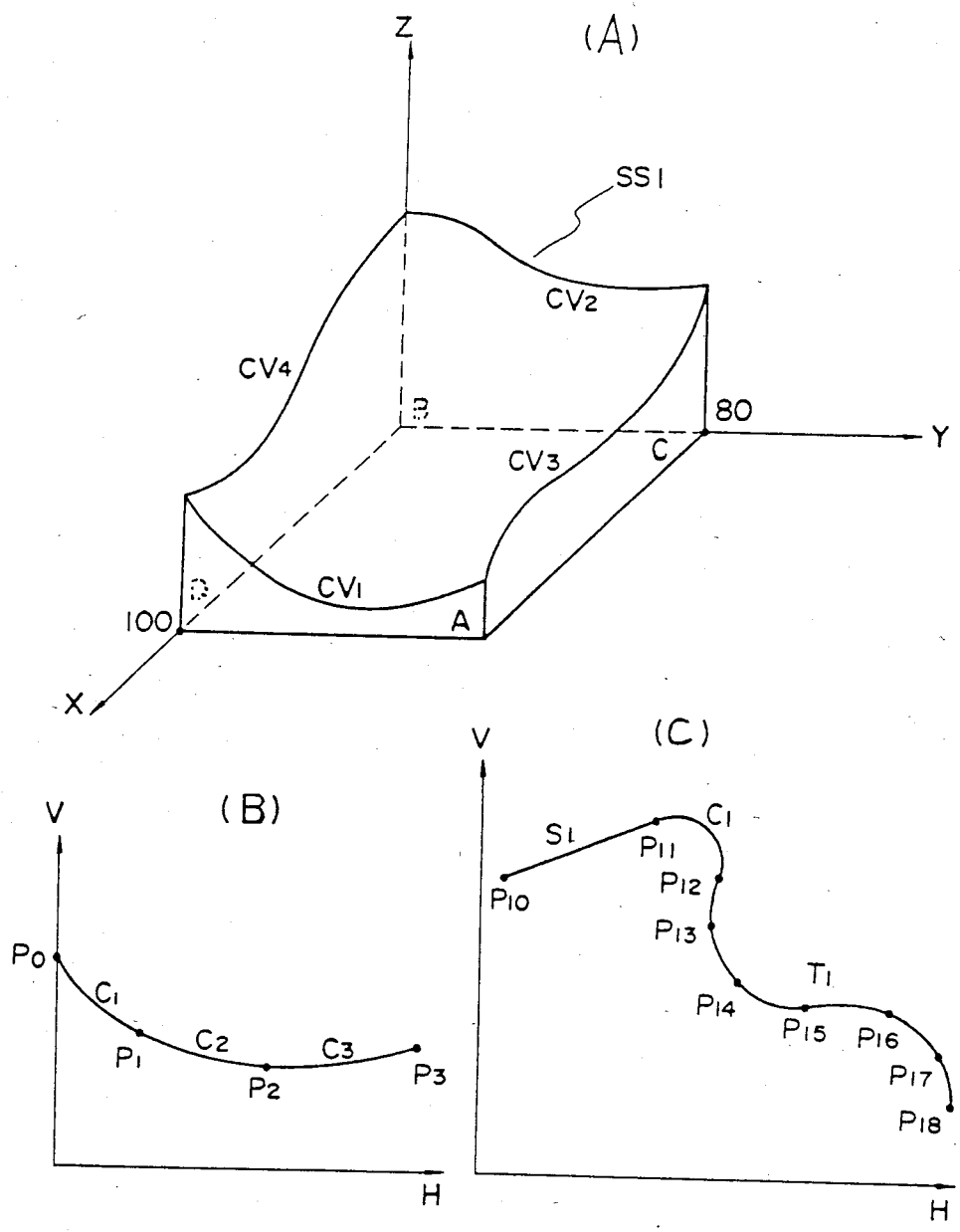
FIG. 4, composed of (A), (B) and (C) is a diagram useful in describing a data input method, FIG. 4A being a perspective view of a curved surface, and FIGS. 4B and 4C showing the section curves.

[I] Data input processing (1) Inputting of section curves $CV_1$, $CV_2$, $CV_3$ and $CV_4$ (a) A section curve $CV_1$ contained in a section A is subjected to a transformation to place it in an H-V plane, as shown in FIG. 4B. Here the section curve $CV_1$ shall be comprised of a series of three connected arcs $C_1$, $C_2$ and $C_3$, and the start point and end point of each arc shall be represented by $(P_0, P_1)$, $(P_1, P_2)$, $(P_2, P_3)$, respectively.

(b) After $CV_1$ has been adopted as the term for the section curve in section A, the section curve $CV_1$ is defined in the following manner and then applied to the processor as an input:

$CV_1 = *$
$P_0 (...)$
$C_1 (...), P_1 (...)$
$C_2 (...), P_2 (...)$
$C_3 (...), P_3 (...)$.

The center and radius of an arc $C_{i(i=1,2,3)}$ is specified within the parentheses following $C_{i(i=1,2,3)}$, and the coordinates of the point $P_i$ are specified in the parentheses following $P_i$.

(c) Finally, the terms $CV_2$, $CV_3$ and $CV_4$ are similarly assigned to the section curves contained in the sections B, C, and D, respectively, and the section curves are defined as described above and then entered into the processor.

It should be noted that while three connected arcs were taken as constructing the section curve $CV_1$ contained in the section A, a section curve $CV_i$ generally is not limited to a series of arcs alone but is defined as a curve composed of line segments, arcs and a given series of points and the like that are smoothly connected. FIG. 4C is an example of such a section curve. Here a line segment $S_1$ extending from a point $P_{10}$ to a point $P_{11}$, an arc $C_1$ extending from the point $P_{11}$ to a point $P_{12}$, and a curved segment $T_1$ extending from the point $P_{12}$ to the point $P_{18}$ through a series of points $P_{13}$ through $P_{17}$, are smoothly connected to form a curve.

After the section curves $CV_{i(i=1,2,3,4)}$ in respective sections have been defined by observing the above-mentioned steps (a) through (c) and then applied to the processor as inputs, the curved surface $SS_1$ is defined as shown below using the aforesaid section curves, and is then applied to the processor.

(2) Inputting of surface $SS_1$

The inputting of the curved surface $SS_1$ is performed after the curved surface has been defined in the following manner:

$SS_1 = 201$, $BC_1$ ($CV_1$, YZ, 100), $BC_2$ ($CV_2$, YZ), $DC_1$ ($CV_3$, XZ, 80), $DC_2$ ($CV_4$, XZ).

Here the number 201 is a type number that represents the type of curved surface that is to be generated; it allows curved surfaces of various types to be specified depending upon the particular objective. $BC_1$ ($CV_1$, YZ, 100) represents a reference curve and shows that the curve $CV_1$ lies in a section which is parallel to the YZ plane, that the section cuts the X-axis at a point $x=100$, and that the curve $CV_1$ has already been defined. Similarly, $BC_2$ ($CV_2$, YZ) means that the curve $CV_2$ is a reference curve on the YZ plane. $DC_1$ ($CV_3$, XZ, 80) and $DC_2$ ($CV_4$, XZ) denote section curves and indicate that the curves $CV_3$, $CV_4$ each lie in parallel with the XZ plane, the curve $CV_3$ cutting the Y-axis at a point $Y=80$, the curve $CV_4$ lying on the XZ plane.

In the case described above, $BC_1$, $BC_2$, $DC_1$ and $DC_2$ all lie on the coordinate planes or on planes which lie in parallel with the coordinates planes. However, spatially oblique planes can be specified by changing the indications within the parentheses that follow $BC_1$, $BC_2$, $DC_1$ and $DC_2$.

Thus, the section data and section curve data necessary for generating the curved surface $SS_1$ is input through the steps (1) and (2) described above.

The processor, once provided with the input data, begins processing to create the curved surface. This is done by performing the process for intermediate section generation, for intermediate section curve generation and finally, for generation or creation of the desired curved surface.

[II] Processing for intermediate section generation

An intermediate section is generated by the first, second, third or fourth method of intermediate section generation, described above, in accordance with given section data and given section curve data obtained from a blueprint (which data has already been fed into the processor by the data input processing step [I] set forth above). Further, the intermediate section is specified by "intermediate section information". The latter contains "section information" which indicates what the number of the obtained intermediate section in the desired surface is, and "section position information", such as a transformation matrix, which indicates how to transform a specific coordinate system to obtain the derived intermediate section.

The methods of generating an intermediate section will be described next.

(1) First method (Method I) of generating an intermediate section

Figure 5:
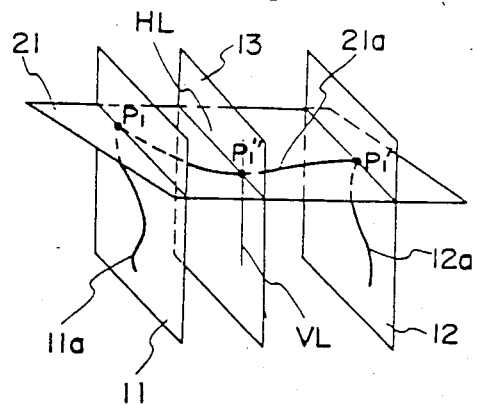
FIG. 5 is a diagram useful in describing a first method of generating an intermediate section.

FIG. 5 illustrates the first method of generating an intermediate section. Given sections which are mutually parallel are shown at numerals 11 and 12, an intermediate section at numeral 13, a reference section at 21, given section curves at 11a, 12a, and a reference curve at 21a. The intermediate section 13 is generated through the following sequence:

Step (1) A point $P_1''$, which divides the length of the reference curve 21a into a ratio of m:n, is computed. The point lies at the intersection of the intermediate section 13 and the reference curve 21a. The ratio m:n is the "section information" mentioned above.

The following steps (1-1) through (1-4) are performed to find the point which divides a given reference curve 21a into a ratio of m:n from one end point $P_1$:

Step (1-1): The length of each element constituting the given reference curve 21a is found (where the term "element" is taken to mean a line segment or an arc), and the lengths obtained are added together to find the total length D of the curve.

Step (1-2): An equation $[m/(m+n)] \cdot D = D'$ is set up.

Step (1-3): This step is the extraction of an element containing a point where distance from the one end point $P_1$ is $D'$. If $D_1$ is taken as the length of the initial element, $D_2$ as the length of the next element., $D_i$ as the length of the i-th element and so on, the extraction of the element is carried out by finding the k that satisfies the following inequality:

$$\sum_{i=1}^{k-1} D_i \leq D' \leq \sum_{i=1}^{k} D_i.$$

Step (1-4): This step is to find the point on the k-th element whose distance from starting point of the k-th element is $D''$, as shown in the following equation, $$D'' = D' - \sum_{i=1}^{k-1} D_i.$$

The obtained point is that which divides the given reference curve 21a into a ratio of m:n from one end thereof. In Step (1-3), when $K=1$, it shall be assumed that $$\sum_{i=1}^{k-1} D_i = 0.$$

Step (2)

This step is the computation of a transformation equation which is utilized for obtaining the intermediate section 13 passing through the point $P_1''$ obtained in Step (1) and lying in parallel with the given section 11. The transformation equation is found from the section data of the given section 11, the coordinates of the dividing point $P_1''$, and from the information indicating which of the first through fourth methods of intermediate section generation was used to generate the intermediate section 13.

By imagining a coordinate system on the intermediate section 13 as formed by the following procedure, these can be computed a transformation equation which transforms the plane of a specific coordinate system (such as the XY plane) into the imagined coordinate system on the intermediate section in space. This transformation equation (transformation matrix) serves as the section position information. The procedure for obtaining the imagined coordinate system is as follows:

Step (2-1): It is assumed that the reference section 21 and intermediate section 13 intersect in a line HL, this line will be divided into two segments by the point of intersection $P_1''$ of the reference curve 21a and the intermediate section 13, as shown in FIG. 5. Of the two line segments that result from this division, one is chosen in accordance with a certain fixed rule. For example, when viewing from the direction of progress of the reference curve 21a, the line segment of the right hand side is chosen [segment a in FIG. 6A].

Step (2-2): In a similar manner, a straight line VL, which is perpendicular to the reference section 21 and which passes through the point of intersection $P_1''$ of the reference curve 21a and the intermediate section 13, is divided into two segments by the reference section 21. Of the two resulting segments, one is chosen in accordance with a certain fixed rule. For example, the reference section 21 is always viewed from the $+Z$ direction, and the segment on the far side is chosen [segment b in FIG. 6A].

Figure 6:
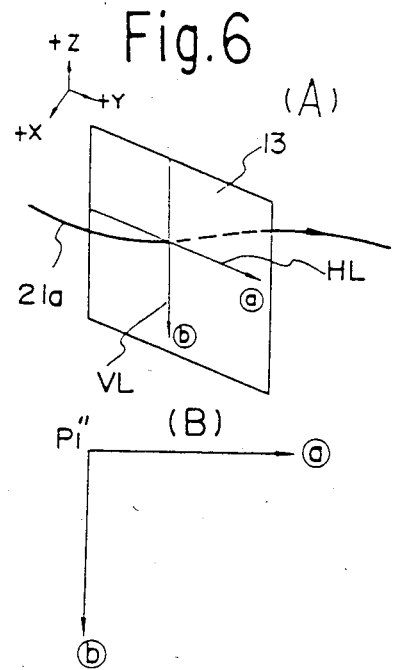
FIG. 6 is a diagram useful in describing the coordinate system for the sections in FIG. 5.

Step (2-3): In this step a planer coordinate system, wherein the point of intersection $P_1''$ of the reference curve 21a and the intermediate section 13 is the origin and wherein the directions a and b in FIG. 6 are the directions of the two axes (the coordinate system is shown in FIG. 6B), is taken as the planar coordinate system of the intermediate section 13.

(2) Second method (Method II) of generating an intermediate section

Figure 7:
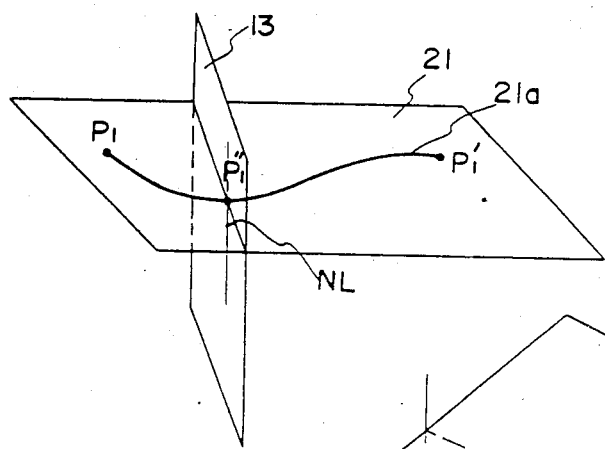
FIG. 7 is a diagram useful in describing a second method of generating an intermediate section.

FIG. 7 is an illustrative view showing the second method of generating an intermediate section. Reference numeral 21 denotes the reference section, 21a a reference curve lying in the reference section 21 and specifying the external form of a body, and 13 the intermediate section. The intermediate section 13 is generated through the following sequence:

Step (1)

The point $P_1''$ is found through the same procedure outlined in Step (1) of the first method (Method I) of generating an intermediate section. The point $P_1''$ is that point which divides the length of the reference curve 21a, between the end points $P_1$, $P_1'$ thereof, into a ratio of m:n. The ratio m:n serves as the section information.

Step (2)

A normal NL is formed, which is perpendicular to the reference curve 21a at the dividing point $P_1''$ found in Step (1). Next there is computed a transformation equation for effecting a transformation from a specific coordinate system to obtain the intermediate section 13 which is perpendicular to the reference section 21 and which contains the normal NL. This transformation equation is computed through the same procedure as that described in Step (2) of the first method (Method I) of generating an intermediate section.

(3) Third method (Method III) of generating an intermediate section

Figure 8:
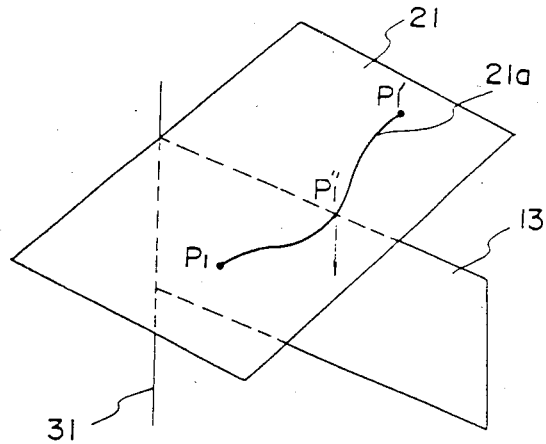
FIG. 8 is a diagram useful in describing a third method of generating an intermediate section.

FIG. 8 is an illustrative view showing the third method of generating an intermediate section. Reference numeral 21 denotes the reference section, 21a a reference curve lying in the reference section 21 and specifying the external form of a body, 31 an axis perpendicular to the reference section 21, and 13 the intermediate section.

Step (1)

The point $P_1''$ is found through the same procedure outlined in Step (1) of the first method (Method I) of generating an intermediate section. The point $P_1''$ is that point which divides the length of the reference curve 21a, between the end points $P_1$ and $P_1'$ thereof, into a ratio of m:n. The ratio m:n serves as the section information.

Step (2)

There is computed a transformation equation for effecting a transformation from a specific coordinate system to obtain the intermediate section 13 that passes through the axis 31 and the dividing point $P_1''$ found in Step (1), and that at the same time is perpendicular to the reference section 21. This transformation equation is computed through the same procedure as that described in Step (2) of the first method (Method I) of generating an intermediate section.

(4) Fourth method (Method IV) of generating an intermediate section

Figure 9:
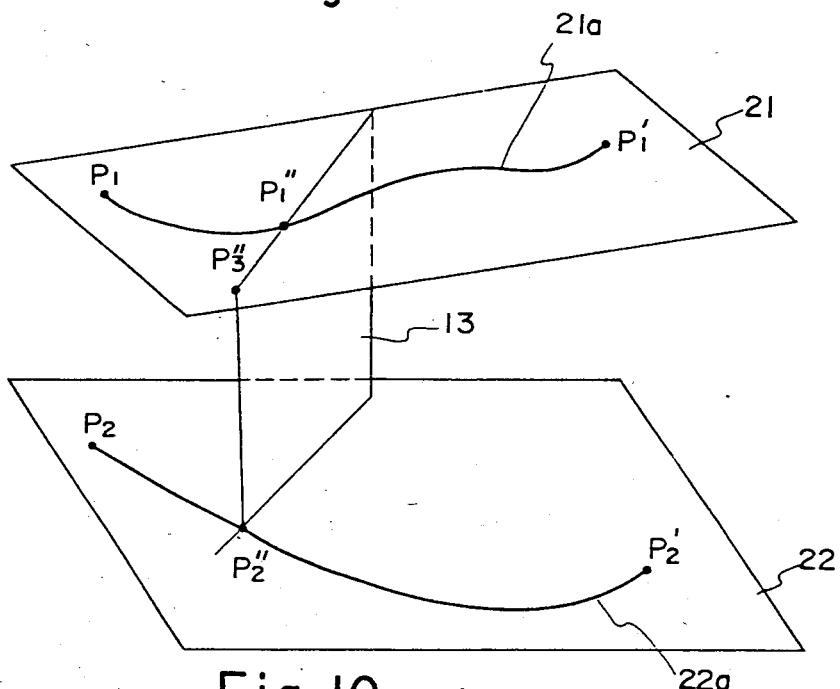
FIG. 9 is a diagram useful in describing a fourth method of generating an intermediate section.

FIG. 9 is an illustrative view showing the fourth method of generating an intermediate section. Reference numerals 21 and 22 denote first and second reference sections, respectively, reference numerals 21a and 22a denote first and second reference curves, respectively, which lie in the reference sections 21 and 22 and which specify the external form of a body, and reference numeral 13 denotes the intermediate section.

Step (1)

Points $P_1''$ and $P_2''$ are found through the same procedure outlined in Step (1) of the first method (Method I) of generating an intermediate section. The points $P_1''$ and $P_2''$ are those that divide lengths of the respective reference curves 21a and 22a into a ratio of m:n. The ratio m:n serves as the section information.

Step (2)

A transmission equation is computed. This is for a transformation from a specific coordinate system in order to obtain the intermediate section 13 which contains the points $P_1''$ and $P_2''$ and which contains the point of intersection $P_3''$ of the first reference section 21 and a perpendicular dropped from the dividing point $P_2''$ to the first reference section 21. The equation is computed through the same procedure as that described in Step (2) of the first method (Method I) generating an intermediate section.

After the intermediate section 13 has been generated by Method I, II, III or IV described above, processing is executed for the generation of an intermediate section curve lying in the intermediate section.

[III] Processing for intermediate section curve generation

An intermediate section curve is generated by one of the following three methods of intermediate section curve generation in accordance with information indicating which one of Methods (I) through (IV) in the processing description [II] has been used to generate the intermediate section, and in accordance also with the given section curve data of the particular section on the blueprint. The procedure for generating an intermediate section curve comprises the following four steps:

(a) obtaining the section information which is the dividing ratio m:n of the desired intermediate section;

(b) transforming each one of given section curves and or intervals formed by two reference curves, so that they lie on a same plane;

(c) generating an intermediate section curve that lies on said plane; and (d) transforming the intermediate section curve on said plane into one which lies in the desired intermediate section.

(1) First method (Method I) of generating an intermediate section curve

The first method of intermediate section curve generation is applicable to a case in which the data relating to two section curves and one reference curve is given. As long as this data is known, the intermediate section curve lying in the intermediate section can be generated regardless of which one of Methods I through III is employed to generate the intermediate section.

Figure 10:
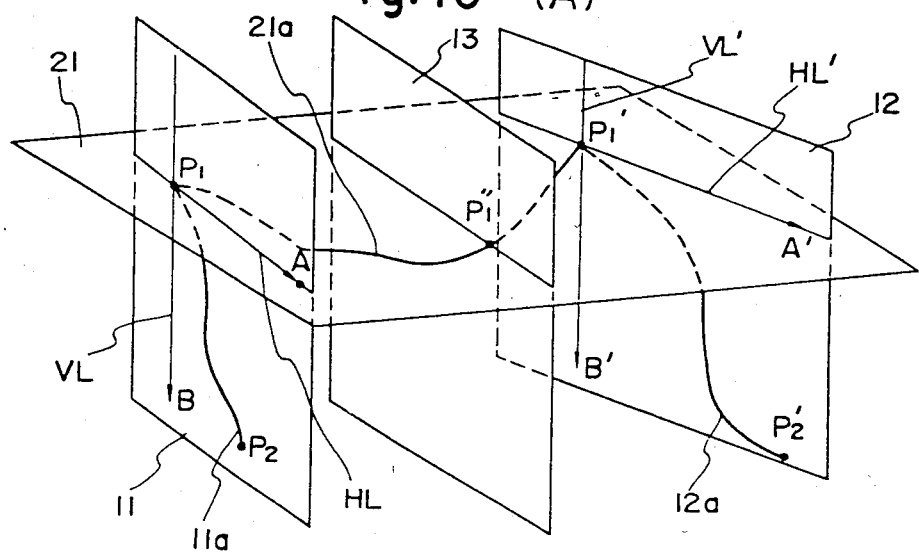
FIG. 10, composed of (A), (B), (C), (D), (E) and (F) is a diagram useful in describing a first method of generating an intermediate section curve.
Figure 10:
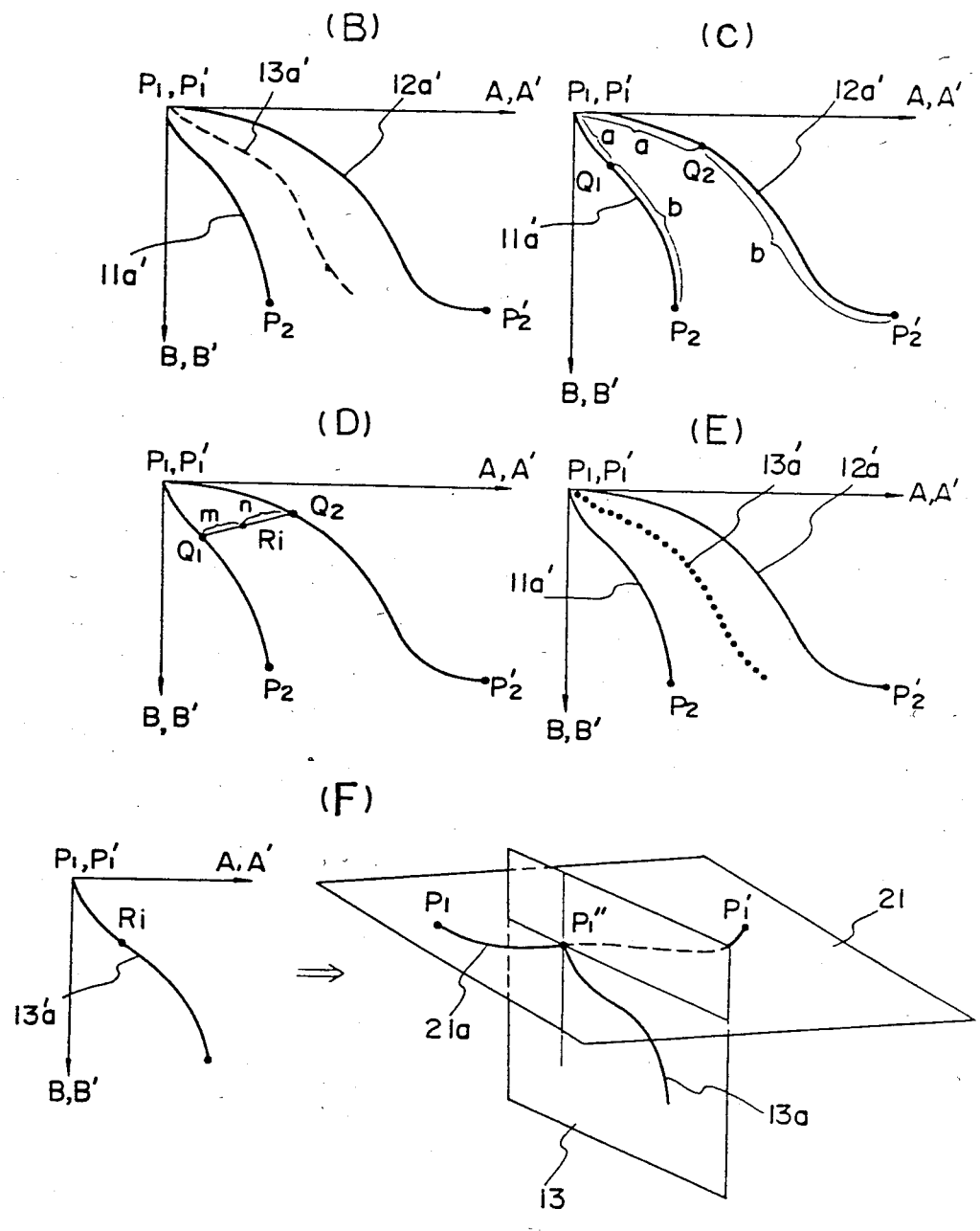

FIG. 10 is an illustrative view showing the first method (Method I) of generating an intermediate section curve. Reference numerals 11 and 12 denote two given sections of a body, and 11a and 12a denote given section curves for a case in which the body is cut by the given sections 11 and 12. Reference numeral 21 denotes a reference section containing points $P_1$ and $P_1'$ on the respective section curves 11 and 12, 21a a reference curve lying in the reference section 21 and specifying the external form of the body, and 13 an intermediate section generated by Method II of intermediate section generation so as to contain a dividing point $P_1''$ which divides the length of the reference curve 21a into a ratio of m:n. It should be noted, however, that the intermediate section 13 could just as well have been generated by either Method I and Method III for intermediate section generation.

The procedure for generating the intermediate section curve by the first method (Method I) of generation will now be described with reference to FIG. 10.

Step (1)

Section information which is the dividing ratio m:n concerning the desired intermediate section 13 is obtained.

Step (2)

The given section curves 11a and 12a are transformed onto the same plane (FIG. 10B). The given section curves 11a, 12a can be considered to be curves which lie on the same plane if they are manipulated by the following steps (2-1) through (2-3):

Step (2-1): The points of intersection $P_1$ and $P_1'$ of the reference curve 21a and the two given sections 11 and 12 are taken as the same point.

Step (2-2): When the lines of intersection HL and HL' of the reference section 21 and the two given sections 11 and 12 are considered, it is seen that the both lines of intersection HL and HL' are divided by the points of intersection $P_1$ and $P_1'$, respectively, of these partitioned segments, those that have the same direction (A and A') with respect to the reference curve 21a are superposed.

Step (2-3): When straight lines VL and VL', which pass through the points of intersection $P_1$ and $P_1'$ of the reference curve 21a and the two given sections 11 and 12, and which at the same time are perpendicular to the reference curve 21a, are considered, it is seen that these lines of intersection VL and VL' are partitioned by the points of intersection $P_1$ and $P_1'$, respectively. Of these partitioned segments, those that have the same direction (B and B') with respect to the reference curve 21a are superposed. Thus, the given section curves, now denoted by 11a' and 12a', are transformed into curves on the same plane. See FIG. 10B.

Step (3)

By using the two given section curves 11a' and 12a' lying in the AB-plane obtaind from Step 2 above, an intermediate section curve 13a' is generated in said plane.

The intermediate section curve 13a' is generated through the following procedure:

Step (3-1): Using the steps (1-1) through (1-4) described above in connection with the Method I for intermediate section generating, points $Q_1$ and $Q_2$, which divide the lengths of the respective given section curves 11a' and 12a' each into a ratio of a:b, are computed (FIG. 10C).

Step (3-2): A dividing point Ri is computed, which point divides a straight line connecting the dividing points $Q_1$ and $Q_2$ into a ratio of m:n of Step (1) (FIG. 10D).

If the coordinates of the dividing points $Q_1$ and $Q_2$ are denoted by $(x_1, y_1)$ and $(x_2, y_2)$, respectively, then the coordinates of a dividing point Ri are calculated from:

$$X = X_1 + \frac{m}{m+n} \cdot (X_2 - X_1)$$

$$Y = Y_1 + \frac{m}{m+n} \cdot (y_2 - y_1).$$

Step (3-2): The intermediate section curve 13a' is generated by a series of points Ri (i=1, 2, ...) obtained by changing the value of the dividing ratio a/b of step (3-1) gradually from 0 to 1 (FIG. 10E). A smoother intermediate section curve 13a' can be obtained by making the successive changes in the value of a/b very small.

Step (4)

The intermediate section curve 13a' on the AB-plane, which section curve 13a' was obtained from Step (3) above, is transformed into a curve lying in the defined spacial intermediate section 13 (FIG. 10A). The equation for the transformation which transforms the AB-plane obtained from Step (2) into the intermediate section 13 can be expressed by a combination of the parallel translation and rotation in space and generally is expressed by the matrix M shown below. Accordingly, by setting up the transformation matrix M for the points Ri (i=1, 2, ...) obtained in Step (3), the points Ri can be transformed into points in the defined special intermediate section 13. The curve connecting the series of points in the defined intermediate section 13 obtained by the matrix transformation is the intermediate section curve 13a (FIG. 10F).

The matrix M expressing the transformation equation has the following form:

$$M = \begin{pmatrix} a_{11} & a_{12} & a_{13} & 0 \\ a_{21} & a_{22} & a_{23} & 0 \\ a_{31} & a_{32} & a_{33} & 0 \\ a_{41} & a_{42} & a_{43} & 1 \end{pmatrix}$$

where $a_{22}$, $a_{23}$, $a_{32}$, $a_{33}$ indicate rotation about the X-axis, $a_{11}$, $a_{13}$, $a_{31}$, $a_{33}$ indicate rotation about the Y-axis, $a_{11}$, $a_{12}$, $a_{21}$, $a_{22}$ indicate rotation about the Z-axis, $a_{41}$ indicates translation parallel to the X-axis, $a_{42}$ translation parallel to the Y-axis, and $a_{43}$ translation parallel to the Z-axis. Accordingly, a point (x, y, z, 1) prior to transformation is transformed into a point (X, Y, Z, 1) in the defined intermediate section by multiplying it together with the transformation equation M, that is (X, Y, Z, 1)=(x, y, z, 1)·M.

The transforming matrix M is obtained by finding the matrix that transforms the origin $P_1$ on the predetermined plane into the corresponding point $P_1''$ in the intermediate section.

(2) Second method (Method II) of generating an intermediate section curve

This method is applicable to a case where the available data is the data relating to one given section curve and two reference section curves. The intermediate section curve lying in the intermediate section can be generated regardless of which one of Methods I through IV for intermediate section generation is employed.

Figure 11:
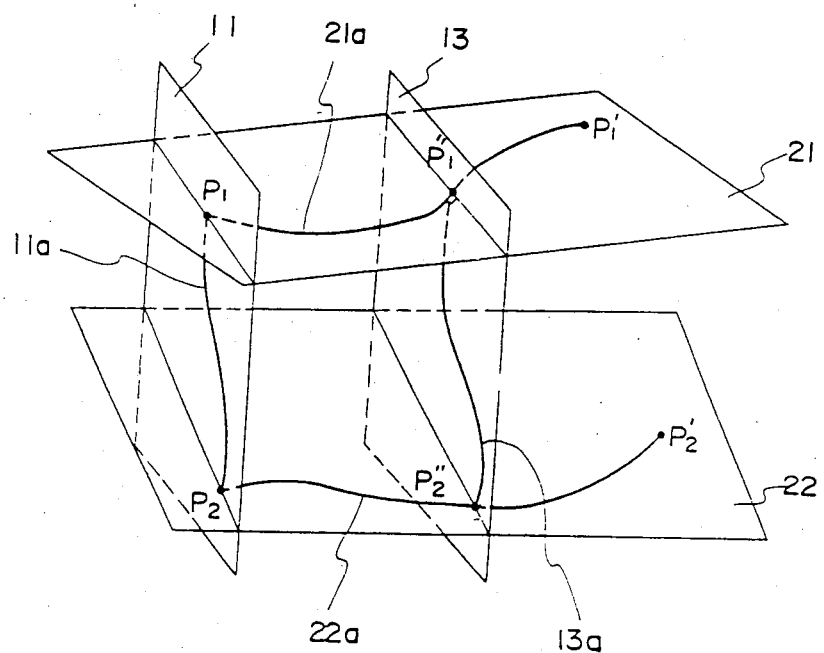
FIG. 11, composed of (A), (B), (C), (D) and (E) is a diagram useful in describing a second method of generating an intermediate section curve.

FIG. 11 is an illustrative view showing the second method of generating an intermediate section curve. Reference numeral 11 denotes a given section of a body, 11a a given section curve for a case in which the body is cut by the given section 11, and 21 and 22 denote first and second reference sections containing the points $P_1$ and $P_2$, respectively, that lie on the given section curve 11a. Reference numerals 21a and 22a denote reference curves which lie in the respective first and second reference sections 21 and 22 and which specify the external form of the body. Reference numeral 13 denotes an intermediate section generated by Method IV for intermediate section generation which contains points $P_1''$ and $P_2''$ that divide the respective first and second reference curves 21a and 22a internally into a ratio of m:n, and which contains the point of intersection $P_3''$ of the first reference section 21 and a perpendicular from the dividing point $P_2''$ to the first reference section 21.

The procedure for generating the intermediate section curve by the second method (Method II) of generation will now be described with reference to FIG. 11.

Step (1)

Section information which is the dividing ratio m/n concerning the desired intermediate section 13 is obtained.

Step (2)

The given section curve 11a and the points of intersection (the dividing points for establishing the ratio m:n) $P_1''$ and $P_2''$ of the intermediate section 13 and the first and second reference curves 21a and 22a are transformed into a curve 11a' and points $P_1''$ and $P_2''$ on the same AB-plane (FIG. 11B). This transformation is performed through the same procedure consisting of the Steps (2-1) through (2-3) described above in connection with the Method I for intermediate section curve generation.

Step (3)

The given section curve 11a' and the points of intersection $P_1''$ and $P_2''$ on the AB-plate, as obtained in Step (2), are used to generate an intermediate section curve lying on said plane.

The intermediate section curve is generated through the following procedure:

Step (3-1): A computation is performed to obtain the ratio $l_1/l_2$ of the length of the line segment connecting the starting point $P_1$ with end point $P_2$ of the given section curve 11a' resulting from the transformation into the predetermined plane, to the length of the line segment connecting the points of intersection $P_1''$ and $P_2'$ which have also been transformed into points in the predetermined plane. In addition, an angle $\theta$ defined by $P_2 P_1 P_2''$ is computed. The angle $\theta$ is the angle of rotation through which the line segment $P_1 P_2$ is rotated in the counterclockwise direction to bring it into coincidence with the line segment $P_1'' P_2''$. The counterclockwise direction is taken as the positive direction (FIG. 11C).

Step (3-2): The curve dividing point Si that divides the given section curve 11a' into a ratio of a:b is computed according to the method of Steps (1-1) through (1-4) as described in connection with the Method I for intermediate section generation (FIG. 11C).

Step (3-3): A computation is performed to find a curve point $Si''$ which results when an external curve dividing point $Si'$ for externally dividing the line segment $P_1 Si$ into the ratio of $l_1:l_2$ is rotated by the angle $\theta$ (FIG. 11C).

Letting $(x_i, y_i)$ represent the coordinates of the curve dividing point Si that divides the given section curve 11a' into a ratio of a:b, letting $(x_o, y_o)$ represent the coordinates of the point $P_1$, and letting $(X, Y)$ represent the coordinates of the point $Si''$, the coordinates of the point $Si''$ are found from:

$$X = x_o + \frac{l_2(x_i - x_o)}{l_1} \cdot \cos\theta - \frac{l_2(y_i - y_o)}{l_1} \cdot \sin\theta$$

$$Y = y_o + \frac{l_2(x_i - x_o)}{l_1} \cdot \sin\theta - \frac{l_2(y_i - y_o)}{l_1} \cdot \cos\theta.$$

Step (3-4): The intermediate section curve 13a' is generated (FIG. 11D) by a series of points $Si''$ (i=1, 2, 3 ...) by changing the value of the dividing ratio a/b of step (3-2) gradually from 0 to 1.

Step (4)

The intermediate section curve 13a' on the AB-plane as obtained from Step (3) above is transformed into a intermediate curve 13a lying in the defined spacial intermediate section 13 (FIG. 11A). The transformation method is the same as that described in Step (4) in connection with the first method I for intermediate-section curve generation.

In the foregoing the intermediate section 13 was generated by Method IV for intermediate section generation, and the intermediate section curve was generated in said intermediate section. This Method II for intermediate section curve generation can, however, be applied to cases where the intermediate section is generated by any one of the Methods I through II for intermediate section generation as well.

FIG. 11E is an illustrative view for describing the generation of an intermediate section curve in an intermediate section generated by the Method II of intermediate section generation. Portions corresponding to those shown in FIG. 11A are denoted by like reference characters and will not be described in detail again. In FIG. 11E, the intermediate section 13 is generated by the second Method II of intermediate section generation so as to contain the point $P_1''$ that divides the first reference curve 21a internally into a ratio of m:n. The procedure for generating the intermediate section curve in this case will now be described with reference to FIG. 11E.

Step (1)

Section information which is the dividing ratio m/n concerning the desired intermediate section 13 is found.

Step (2)

The point of intersection $P_2''$ of the intermediate section 13 and the second reference curve 22a is found.

Step (3)

The intermediate section curve 13a is found by carrying out the steps (2) through (4) of the Method II for intermediate section curve generation described above.

(3) Third method of generating an intermediate section curve

This method is applicable to a case where the available data is the data relating to two given section curves and two reference curves. The intermediate section curve lying in the intermediate section can be generated regardless of which of the Methods I through IV for intermediate section generation is employed.

Figure 12:
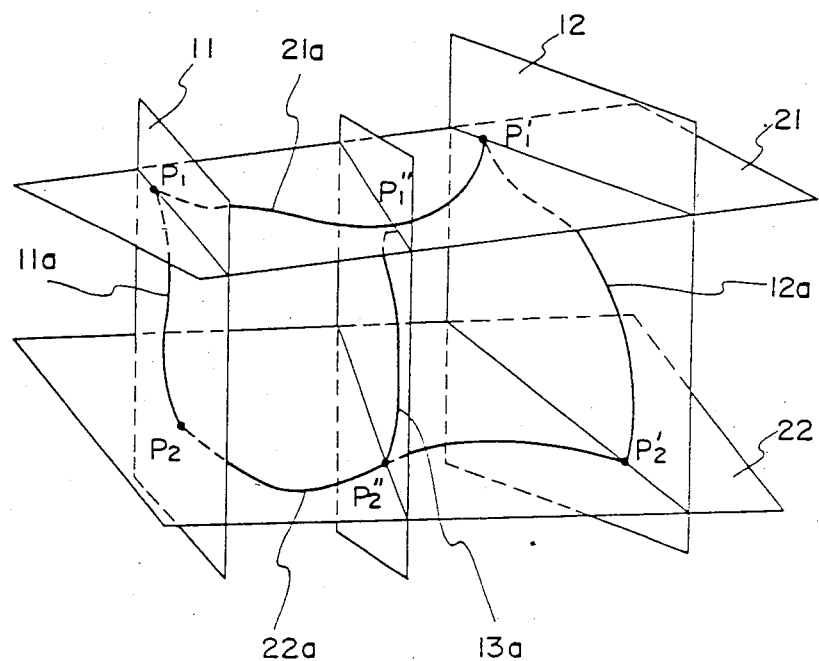
FIG. 12, composed of (A), (B), (C), (D) and (E) is a diagram useful in describing a third method of generating an intermediate section curve.

FIG. 12 is an illustrative view showing the third method (Method III) of generating an intermediate section curve. Reference numerals 11 and 12 denote given sections of a body, and 11a and 12a denote given section curves for a case in which the body is cut by the given sections 11 and 12. Numeral 21 represents a first reference section which contains first points $P_1$ and $P_1'$ lying on the given section curves 11a and 12a, respectively, 22 a second reference section which contains second points $P_2$, $P_2'$ lying on the given curves 11a and 12a, respectively, and 21a and 22a denote first and second reference curves, respectively, which lie in the respective first and second reference sections 21 and 22 and which specify the external form of the body. Reference numeral 13 denotes an intermediate section generated by the Method IV for intermediate section generation which contains points $P_1''$ and $P_2''$ that divide the respective first and second reference curves 21a and 22a internally into a ratio of m:n, and which contains the point of intersection $P_3''$ of the first reference plane 21 and a perpendicular from the dividing point $P_2''$ to the first reference section 21.

The procedure for generating the intermediate section curve by the Method III for section curve generation will now be described with reference to FIG. 12. Here the Method III is a combination of the methods I and II for intermediate section curve generation.

Step (1)

Section information which is the dividing ratio m/n concerning the desired intermediate section 13 is found.

Step (2)

The given section curves 11a and 12a and the points of intersection $P_1''$ and $P_2''$ of the intermediate section 13 with the first and second reference curves 21a, 22a are transformed into curves and points on the same plane (AB-plane) (FIG. 12B). This transformation is performed through the same procedure consisting of the Steps (2-1) through (2-3) described above in connection with the Method I for intermediate section curve generation.

Step (3)

The given section curves 11a' and 12a' *on the AB-plane as obtained in Step (*2) are used to generate a intermediate section curve 13b lying on said AB-plane. This intermediate section curve 13b is generated according to the same procedure consisting of the Steps (3-1) through (3-3) described in connection with the Method I for intermediate section curve generation (FIG. 12C).

Step (4)

The intermediate section curve 13b and the points of intersection $P_1''$ and $P_2''$ on the AB-plane as obtained in Step 3 above are used to generate an intermediate section curve 13a' on said AB-plane. This intermediate section curve 13a' is generated according to the same procedure consisting of the steps (3-1) through (3-4) described in connection with the Method II for intermediate section curve generation (FIG. D).

Step (5)

The intermediate section curve 13a' on the AB-plane obtained from Step (4) above is transformed into a curve lying in the defined spacial intermediate section 13 (FIG. 12A). The transformation method is the same as that described in Step (4) in connection with the Method I for intermediate section curve generation.

In the foregoing the intermediate section was generated by the Method IV for intermediate section generation, and the intermediate section curve was generated in said intermediate section. The Method II for intermediate section curve generation can, however, be applied to cases where the intermediate section is generated by any of the Methods I through III for intermediate section generation as well.

FIG. 12E is an illustrative view for describing the generation of an intermediate section curve in an intermediate section generated by the Method II for intermediate section generation. Portions corresponding to those shown in FIG. 112A are denoted by like reference characters and will not be described in detail again. In FIG. 12E, the intermediate section 13 is so generated by the Method II for intermediate section generation as to contain the point $P_1''$ that divides the first reference curve 21a internally into a ratio of m:n. The procedure for generating the intermediate section curve in this case will now be described with reference to FIG. 12.

Step (1)

Section information which is the dividing ratio m/n concerning the desired intermediate section 13 is found.

Step (2)

The point of intersection $P_2''$ of the intermediate section 13 and the second reference curve 22a is found.

Step (3)

The intermediate section curve 13a is generated by carrying out the steps (2) through (4) of the Method III for intermediate section curve generation described above.

[IV] Processing for curved surface generation

Figure 13:
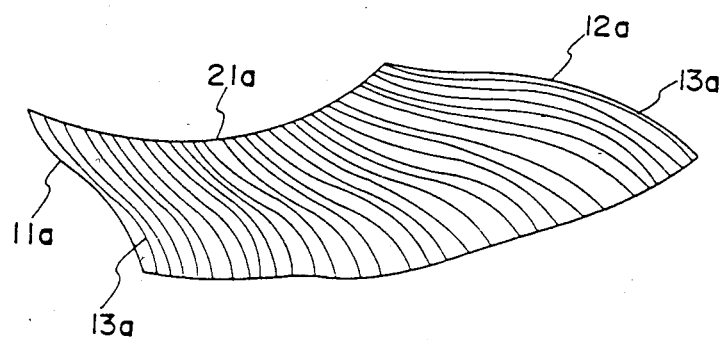
FIG. 13, FIGS. 14A and 14B illustrate curved surfaces created in accordance with the present invention.
Figure 14:
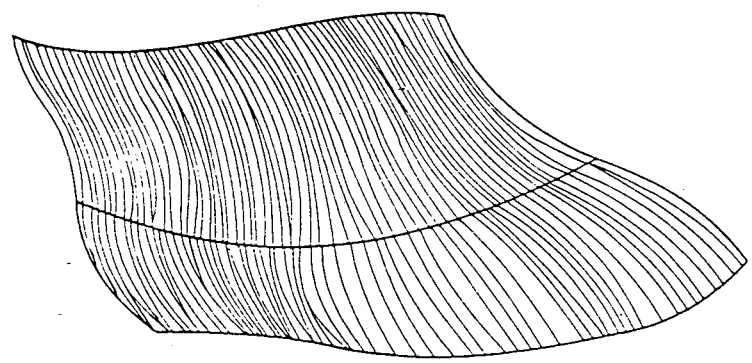
Figure 14:
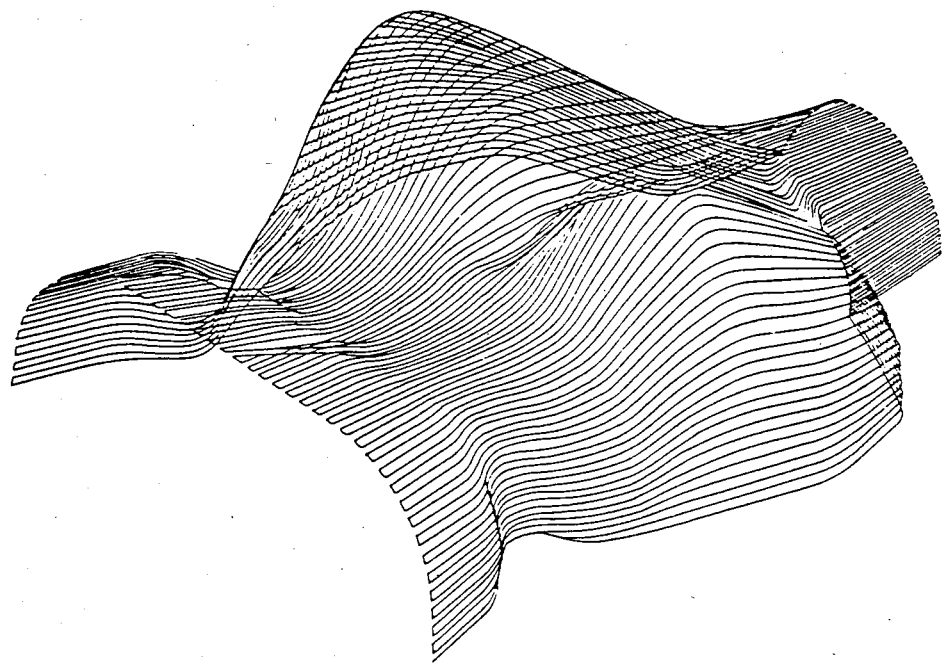

A number of the given section curves 13a are obtained when the foregoing processing for intermediate section generation and processing for intermediate section curve generation are repeated while successively changing the dividing ratio m:n from 0:1 to 1:0. A smooth curved surface can then be generated by connecting the obtained intermediate section curves. A smoother curved surface can be obtained by making the successive changes in the ratio m:n very small. FIG. 13 shows an example of a surface generated by the method of the present invention. Even a plurality of continuous curved surfaces can be generated. In such a situation, applying the invention method of curved surface generation to individual ones of the curved surfaces makes it possible to generate a smooth, continuous curved surface of the type shown in FIGS. 14A and 14B. The latter illustrates the sculptured surface of a female torso drawn by applying the present invention.

Figure 15:
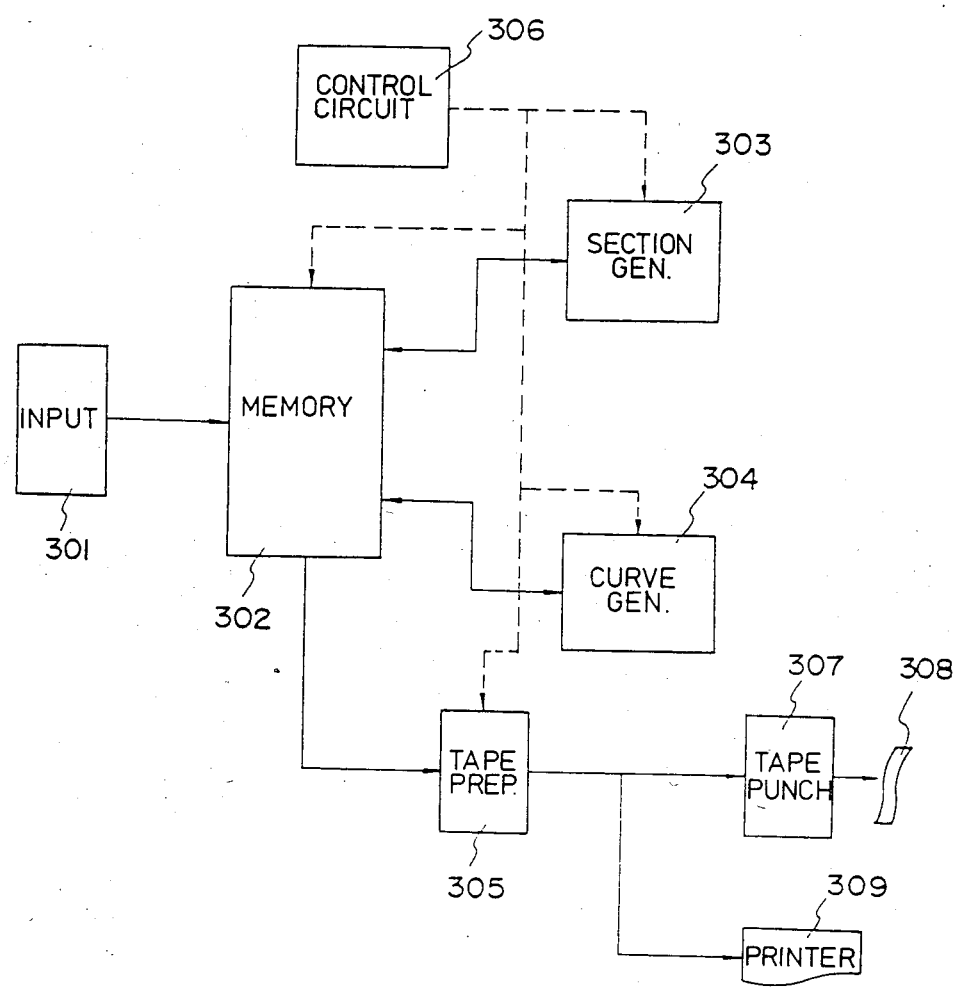
FIG. 15 is a block diagram of a curved surface generating apparatus for realizing the method of the present invention.

FIG. 15 shows a conceptual block diagram of the flow within an apparatus for generating curved surfaces in order to practice the present invention. The apparatus includes a data input unit 301 for inputting data such as tha representing the given sections and section curves drawn on the plane of a blueprint, and a memory 302 for storing the given section and section curve data as well as data such as that representing intermediate sections and intermediate section curves generated by a conceptual intermediate section generating device 303 and by a conceptual intermediate section curve generating device 304. The intermediate section generating device 303, using the section data and section curve data stored in the memory 302 as well as information indicative of which one of the first through fourth methods of intermediate section generation is to be used to generate an intermediate section, generates the particular intermediate section in accordance with the steps constituting the selected method of intermediate section generation and stores the intermediate section data relating to this intermediate section in the memory 302. The intermediate section curve generating device 304, using the section curve data, section data, intermediate section data as well as information indicative of which one of the first through third methods of intermediate section curve generation is to be used to generate an intermediate section curve, generates the intermediate section curve in accordance with the steps constituting the selected method of intermediate section curve generation and stores the intermediate section curve data relating to this intermediate section curve in the memory 302. A tape preparation control unit 305 reads from the memory 302 such data as the stored intermediate section data and stored data relating to the intermediate section curves lying on the intermediate sections, and delivers this data to a tape puncher 307 and printer 309 upon converting it into an NC tape format for machining a metal mold or the like. A control circuit 306 controls the memory 302, intermediate section generating device 303, intermediate section curve generating device 304 and tape preparation control unit 305. Numeral 308 denotes a paper tape punched by the puncher 307.

The above apparatus for generating curved surfaces sequentially produces intermediate section curves in accordance with the processing steps for intermediate section generation and for intermediate section curve generation, and converts the intermediate section curve data into a tape format before delivering it to the tape puncher 307 and printer 309.

Figure 16:
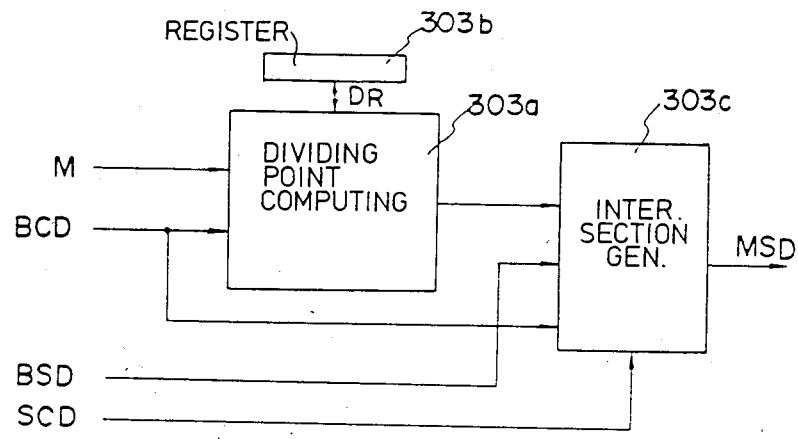
FIG. 16 is a block diagram of a device for generating intermediate sections according to the present invention.

A conceptual block diagram of the flow for the conceptual intermediate section generating device 303 is shown in FIG. 16. The device includes a dividing point computing unit 303a for computing the coordinates of the dividing point $P_1''$ (such as shown in FIG. 10A) upon receiving data BCD specifying the reference curve 21a, a dividing number M and dividing ratio data DR, and a dividing ratio storage register 303b for storing new dividing ratio data DR each time the gereration of one intermediate section curve has been completed. More specifically, the dividing point computing unit 303a derives the dividing ratio m:n by performing the computations $i+1 \to m$ and $M-m \to n$ and delivers this as the dividing ratio data to the dividing ratio storage register 303b, and finds the coordinates of the dividing point for establishing this ratio in accordance with the Steps (1-1) through (1-4) described above in connection with Method I of generating an intermediate section. The initial value of i in the above computation is 1, and the processing for intermediate section generation is executed until such time that $i=(M-1)$. The device includes also an intermediate section generating unit 303c which generates intermediate sections by employing reference section data BSD, reference curve data BCD and section generation data SCD indicative of which one of the first through fourth methods of intermediate section generation is to be employed for generating the section. In other words, assuming that an intermediate section is to be generated by the Method II, the conceptual generating unit 303c will compute and deliver intermediate section data MSD relating to a section which contains the dividing point $P_1''$ and which is at the same time perpendicular to both a reference section and a reference curve.

Figure 17:
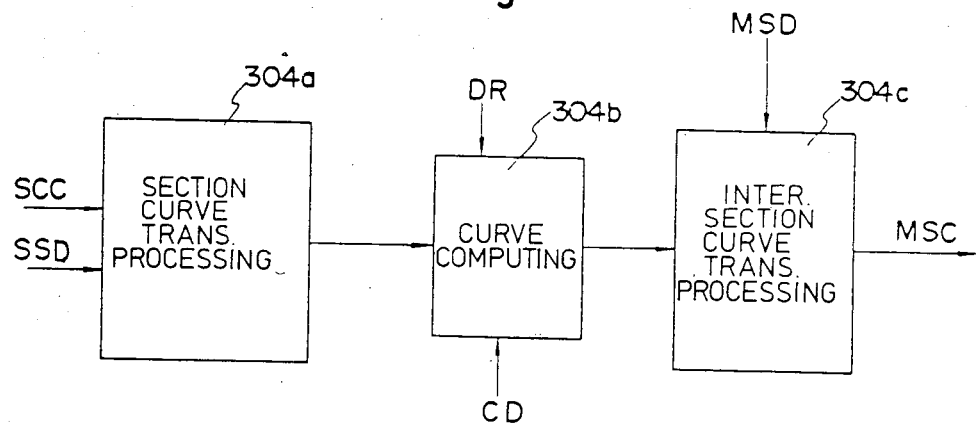
FIG. 17 is a block diagram of a device for generating intermediate section curves according to the present invention.

A conceptual block diagram of the flow for the conceptual intermediate section curve generating device 304 is illustrated in FIG. 17. The device includes a conceptual section curve transformation processing unit 304a whose inputs are section curve data SCC and section data SSD. Assuming that the input data represents the two section curves and one reference section curve, the processing unit 304a executes processing to develop the section curves on the same plane and to transform the given section curve data into a coordinate system on said plane in accordance with the Step (2-1) through (2-3) of the Method I of intermediate section curve generation. The intermediate section curve generating device 304 also includes conceptual intermediate section curve computing unit 304b and conceptual intermediate section curve transformation processing unit 304c. The computing unit 304b generates intermediate section curves based on (a) the dividing ratio (m/n) stored in the dividing ratio storage register 303b of FIG. 16, and (b) control data CD findicative of which one of the first through third methods of intermediate section curve generation is to be used to generate the particular intermediate section curve. Assuming for example that an intermediate section curve is to be generated by the Method I, the computing unit 304b executes processing in accordance with Step (3) of the Method I and generates the intermediate section curve 13a' (FIG. 10E) in the form of a continuous number of points $R_i (i=1, 2 \ldots)$. The transformation processing unit 304c in this case executes processing for the matrix transformation in Step (4) of the Method I and develops the intermediate section curve 13a', delivered by the intermediate section curve computing unit 304b, on the intermediate section data MSD generated by the intermediate section generating unit 303c shown in FIG. 16. The output of the transformation processing unit 304c is intermediate section curve data MSC which is stored sequentially in a memory device that is not shown. A plurality of the intermediate section curves are processed in the above manner and combined to create a body.

It should be noted that the curved surface generating apparatus of FIG. 15 can be composed of a computer system, in which the conceptual control circuit 306 can be replaced by a control program and curved surface generation program and the conceptual intermediate section generating device 303, conceptual intermediate section curve generating device 304 and tape preparation control unit 305 by a processor.

Figure 18:
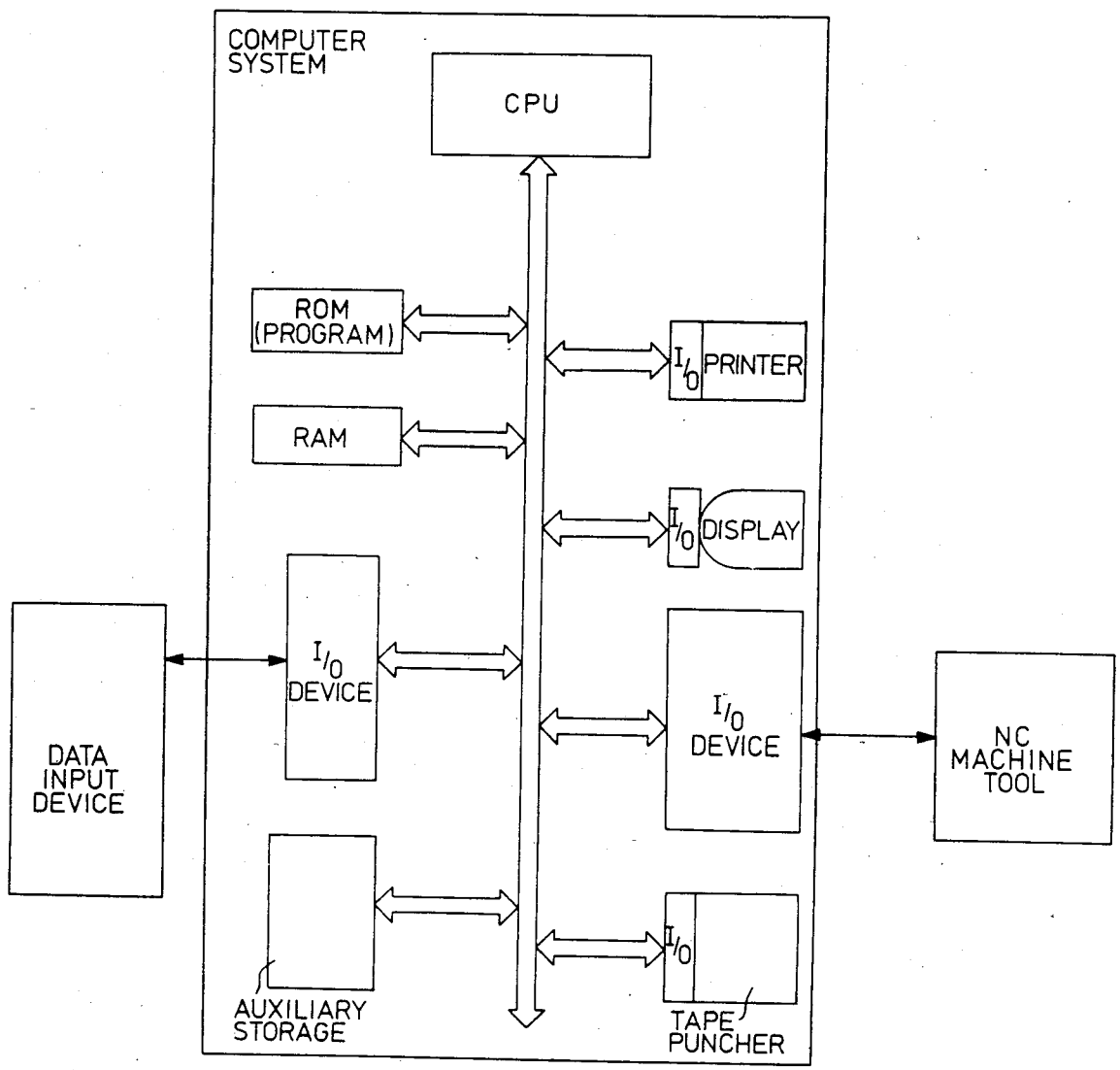
FIG. 18 is a block diagram of a conventional general purpose computer used for controlling a machine tool according to the present invention.

FIG. 18 shows the conventional components of a conventional computer system that can perform the method of the present invention, as conceptionally shown by FIGS. 15-17. FIG. 19 shows the general processing steps of the present invention as previously described in detail herein.

Thus, in accordance with the present invention as described above, curved surfaces can be created from a small quantity of data and processing for creation of the curved surfaces can be executed with ease. This permits curved surfaces to be created even by small-scale computers. The invention makes it possible to create even sophisticated bodies in the form of a continuous series of plural surfaces.

As many widely different embodiments of this invention may be made without departing from the spirit and scope thereof, it is to be understood that the invention is not limited to the specific embodiments thereof except as defined in the appended claims.

What we claim is:

1. A method of machining a curved surface of a three-dimensional body on a workpiece using a digital computer, comprising the steps of:
   (a) inputting, into said computer, data relating to a section which specifies given sections of said body, data relating to a section curve which lies on said section and specifies the external form of said body, data relating to a reference section which contains a point lying on said section curve in said section and which lies perpendicular to said section which specifies said given sections of said body, and data relating to a reference curve which lies on said reference section and which specifies the external form of said body;
   (b) creating data relating to an intermediate section which lies perpendicular to said reference section on the basis of said data which are input to said computer;
   (c) creating intermediate section curve data relating to an intermediate section curve on the basis of said data obtained in said steps (a) and (b);
   (d) creating machining data relating to said curved surface of said body by repeating the said steps (a) and (c) after transferring a point of intersection of said intermediate section curve and said reference curve;
   (e) generating blocks of control data based on said machining data;
   (f) transferring said control data to a machine; and
   (g) controlling the machine to produce said curved surface of said three-dimensional body on the workpiece on the basis of said transferred control data.

2. A method according to claim 1, wherein step (f) comprises the step of punching a numerical control tape in accordance with said created machining data relating to said curved surface.

3. A method according to claim 1, wherein step (b) further comprises the step of generating said intermediate sections that lie in parallel with said given sections.

4. A method according to claim 1, wherein step (b) further comprises the step of generating each of said intermediate sections where each lies perpendicular to said reference sectin and to the reference curve which lies in said reference section.

5. A method according to claim 1, wherein step (b) further comprises the step of generating each of said intermediate sections where each lies perpendicular to said reference section and passes through a straight line which is perpendicular to said reference section, said straight line serving as an axis from which said intermediate sections radiate.

6. A method according to claim 1, wherein step (a) further comprises the step of inputting first and second reference sections containing respective first and second reference curves which specify the external form of the body, as said given sections.

7. A method according to claim 1, wherein step (b) further comprises the step of generating each of said intermediate sections where each lies perpendicular to one of said reference sections.

8. A method of machining a curved surface of a three-dimensional body on a workpiece using a digital computer, comprising the steps of:
   (a) inputting, into said computer, section data relating to two parallel sections which specify given sections of said curved surface of said three-dimensional body, and section data relating to a reference section which contains a reference curve specifying the external form of the body and containing first and second points lying on respective given section curves in respective ones of said given sections;
   (b) creating data relating to a plurality of given sections of the body in accordance with said section data;
   (c) dividing said reference curve into a plurality of segments at dividing points and producing dividing point data;
   (d) computing an equation for a transformation from a specific coordinate system to obtain an intermediate section which contains one of the dividing points on the reference curve and which lies in parallel with said parallel sections;
   (e) computing data relating to an intermediate section curve in said intermediate section on the bases of data relating to the section curves in respective ones of said parallel sections and on the basis of the dividing point data relating to the position of the one of said dividing points contained in said intermediate section;
   (f) computing intermediate curve section data relating to said intermediate section curve of said intermediate section containing the one of said dividing points;
   (g) creating machining data relating to said curved surface of said three-dimensional body from intermediate curve section data relating to a plurality of intermediate section curves;
   (h) generating blocks of control data based on said machining data;
   (i) transferring said control data to a machine; and
   (j) controlling the machine to produce said curved surface of said three-dimensional body on the workpiece on the basis of said transferred control data.

9. A method according to claim 8, wherein step (b) comprises the steps of:
   (i) dividing said reference curve internally into a ratio of m:n; and
   (ii) generating said dividing points by changing the ratio m:n.

10. A method according to claim 9, wherein step (d) comprises the steps of:
   (i) transforming each section curve into a corresponding curve in a predetermined planar coordinate system to bring into coincidence the first and second points and to bring into coincidence lines of intersection of the reference section and said two parallel sections;
   (ii) computing an intermediate point by dividing internally into a ratio of a:b each section curve transformed into said predetermined planar coordinate system, the dividing at the ratio a:b designating third and fourth points, and dividing internally into the ratio of m:n a straight line connecting the third and fourth points at which said section curves are internally divided into the ratio a:b, the straight line dividing designating the intermediate point;
   (iii) computing an untransformed intermediate section curve in said predetermined planar coordinate system by computing a number of intermediate points by varying the ratio a:b; and
   (iv) transforming said untransformed intermediate section curve in said predetermined planar coordinate system into the corresponding intermediate section curve in said intermediate section.

11. A method of machining a curved surface of a three-dimensional body on a workpiece using a digital computer, comprising the steps of:
   (a) inputting, into said computer, section data relating to at least two sections of the body, and data relating to a reference section which contains a reference curve specifying the external form of the body and containing first and second points lying on respective section curves in respective ones of said two sections;
   (b) specifying a plurality of given sections of the body in accordance with said section data;
   (c) dividing said reference curve into a plurality of segments at a dividing point and producing dividing point information;
   (d) computing an equation for a transformation from a specific coordinate system to obtain an intermediate section which contains one of the dividing points on the reference curve and which lies perpendicular to said reference section and to said reference curve;
   (e) computing data relating to an intermediate section curve in said intermediate section on the basis of said dividing point information relating to the position of the one of said dividing points contained in said intermediate section and on the basis of data relating to the section curves in respective ones of said two sections;
   (f) computing intermediate curve section data relating to said intermediate section curve of the intermediate section containing said dividing point;
   (g) creating machining data relating to said curved surface of said three-dimensional body on the basis of said intermediate curve section data relating to a plurality of intermediate section curves;
   (h) generating blocks of control data based on said machining data;
   (i) transferring said control data to a machine; and
   (j) controlling the machine to produce said curved surface of said three-dimensional body on the workpiece on the basis of the transferred control data.

12. A method according to claim 11, wherein step (d) comprises the steps of:
   (i) dividing said reference curve internally into a ratio m:n; and
   (ii) generating said dividing points by changing the ratio m:n.

13. A method according to claim 12, wherein step (d) includes the steps of:
   (i) transforming each said section curve into a corresponding section curve in a predetermined planar coordinate system to bring into coincidence said two points whch are points of intersection of the reference curve and each of said two sections and to bring into coincidence lines of intersection of the reference section and each of said two sections;
   (ii) computing an intermediate point by dividing internally into a ratio a:b each said corresponding section curve transformed into said predetermined planar coordinate system, the dividing at the ratio a:b designating third and fourth points, and dividing internally into the ratio m:n a straight line connecting the third and fourth points at which said section curves are internally divided into the ratio a:b, the straight line dividing designating the intermediate point;
   (iii) computing an untransformed intermediate section curve in said predetermined planar coordinate system by computing a number of intermediate points by changing the ratio a:b, and
   (iv) transforming the untransformed intermediate section curve in said predetermined planar coordinate system into the intermediate section curve in said intermediate section.

14. A method of machining a curved surface of a three-dimensional body on a workpiece using a digital computer, comprising the steps of:
   (a) inputting, into said computer, section data relating to two sections of the body, and data relating to a reference section which contains a reference curve specifying the external form of the body and containing first and second points lying on respective section curves in respective ones of said two sections;
   (b) specifying a plurality of given sections of the body in accordance with said body;
   (c) dividing said reference cruve into a plurality of segments at dividing points and producing dividing point data;
   (d) computing an equation for a transformation from a specific coordinate system to obtain an intermediate section which contains one of said dividing points on the reference curve and which contains a straight line that lies perpendicular to the reference section;
   (e) computing data relating to an intermediate section curve on the basis of data relating to the section curves in respective ones of said two sections and on the basis of said dividing point data relating to the position of the one of said dividing points contained in said intermediate section;
   (f) computing intermediate section curve data relating to intermediate section curves of a plurality of intermediate sections which contain said dividing points and are arranged radially around said straight lines;
   (g) creating machining data relating to the curved surface of said three-dimensional body on the basis of a plurality of said intermediate section curves;
   (h) generating blocks of control data based on said machining data;
   (i) transferring said control data to a machine; and
   (j) controlling the machine to produce said curved surface of said three-dimensional body on the workpiece on the basis of the transferred control data.

15. A method according to claim 14, wherein step (b) further comprises the steps of:
   (i) dividing said reference curve internally into a ratio m:n; and
   (ii) generating said dividing points by changing the ratio m:n.

16. A method according to claim 15, wherein step (d) comprises the steps of:
   (i) transforming each said section curve into a corresponding section curve in a predetermined planar coordinate system to bring into coincidence the first and second points and to bring into coincidence lines of intersection of said reference section and each of said two sections;
   (ii) computing an intermediate point by dividing internally into a ratio a:b each said corresponding section curves transformed into said predetermined planar coordinate system, the dividing at the ratio a:b designating third and fourth points, and dividing internally into a ratio m:n a straight line connecting the third and fourth points at which said section curves are internally divided into the ratio a:b, the straight line dividing designating the intermediate point;

(iii) computing an untransformed intermediate section curve in said predetermined planar coordinate system by computing a number of intermediate points by changing the ratio a:b; and (iv) transforming the untransformed intermediate section curve in said predetermined planar coordinate system into the intermediate section curve in said intermediate section.

17. A method of machining a curved surface of a three-dimensional body on a workpiece using a digital computer, comprising the steps of:

(a) inputting, into said computer, section data relating to a section of the body, and data relating to first and second reference sections which contain first and second reference curves specifying the external form of the body and containing first and second points, respectively, lying on a section curve in said section;

(b) specifying a plurality of given sections of said three-dimensional body in accordance with said body;

(c) dividing said first reference curve into a plurality of segments at dividing points;

(d) computing an equation for a transformation from a specific coordinate system to obtain an intermediate section which contains a one of the dividing points on said first reference curve and which lies in parallel with said section, and a point of intersection of said intermediate section and said second reference curve;

(e) computing data relating to an intermediate section curve in said intermediate section on the basis of data relating to the section curve in said section and on the basis of data relating to the positions of the one of said dividing points and the point of intersection contained in said intermediate section;

(f) computing intermediate section curve data relating to said intermediate section curves of a plurality of intermediate sections containing said dividing points;

(g) creating machining data relating to the curved surface of the three-dimensional body on the basis of a plurality of said intermediate section curves;

(h) generating blocks of control data based on said machining data;

(i) transferring said control data to a machine; and (j) controlling the machine to produce said curved surface of said three-dimensional body on the workpiece on the basis of the transferred control data.

18. A method according to claim 17, wherein said step (b) comprises the steps of:

(i) dividing said first reference curve internally into a ratio of m:n; and (ii) generating said dividing points by changing the ratio m:n.

19. A method according to claim 18, wherein step (e) comprises the steps of:

(i) transforming said section curve, said point of intersection and the one of said dividing points into a corresponding section curve and corresponding points in a predetermined coordinate system to bring into coincidence the first point and the one of the dividing points of said intermediate section and said first reference curve, and to bring into coincidence the line of intersection of said section and said first reference section and the line of intersection of said intermediate section and said first reference section;

(ii) computing a ratio L1:L2, where L1 is the length of a line segment connecting the first point and the second point of the section curve transformed into the corresponding section curve in said predetermined planar coordinate system, and where L2 is the length of a line segment connecting the one of said dividing points and the point of intersection transformed into points in said predetermined planar coordinate system;

(iii) finding a first curve point which divides said transformed corresponding section curve internally into a ratio a:b;

(iv) computing an angle defined by the second point, the first point and the point of intersection;

(v) computing a second curve point obtained by rotating by the angle a third curve point which divides a line segment defined by the first point and the first curve point externally into the ratio L1:L1;

(vi) generating an untransformed intermediate section curve in said predetermined planar coordinate system by finding a plurality of second curve points by changing the ratio a:b; and (vii) transforming the untransformed intermediate section curve in said predetermined planar coordinate system into the intermediate section curve in said intermediate section.

20. A method of machining a curved surface of a three-dimensional body on a workpiece using a digital computer, comprising the steps of:

(a) inputting, into said computer, section data relating to a section of the body, and data relating to first and second reference sections which contain first and second reference curves specifying the external form of the body and contain first and second points, respectively, lying on a section curve in said section;

(b) specifying a plurality of given sections of said three-dimensional body in accordance with said data;

(c) dividing said first reference curve into a plurality of segments at dividing points;

(d) computing an equation for a transformation from a specific coordinate system to obtain an intermediate section which contains a one of the dividing points on said first reference curve and which is perpendicular to said first reference section and to said first reference curve, and a point of intersection of said intermediate section and said second reference curve;

(e) computing data relating to an intermediate section curve in said intermediate section on the basis of data relating to the section curve in said section and on the basis of data relating to the positions of the one of said dividing points and said point of intersection;

(f) computing intermediate section curve data relating to said intermediate section curves of a plurality of intermediate sections containing said dividing points;

(g) creating machining data relating to the curved surface of the three-dimensional body on the basis of a plurality of said intermediate section curve data relating to a plurality of intermediate section curves;

(h) generating blocks of control data based on said machining data;

(i) transferring said control data to a machine; and (j) controlling the machine to produce said curved surface of said three-dimensional body on the workpiece on the basis of the transferred control data.

21. A method according to claim 20,, wherein step (b) comprises the steps of:

(i) dividing said first reference curve internally into a ratio m:n; and (ii) generating said dividing points by changing the ratio m:n.

22. A method according to claim 21, wherein step (e) comprises the steps of:

(i) transforming said section curve, said point of intersection and the one of said dividing points into a corresponding curve and corresponding points in a predetermined coordinate system to bring into coincidence the first point and the one of the dividing points of said intermediate section and said first reference curve, and to bring into coincidence the line of intersection of said section and said first reference section and the line of intersection of said intermediate section and said first reference section;

(ii) computing a ratio L1:L2, where L1 is the length of a line segment connecting the first point and the second point of the section curve transformed into the corresponding curve in said predetermined planar coordinate sytem, and where L2 is the length of a line segment connecting the one of said dividing points and the point of intersection transformed into points in said predetermined planar coordinate system;

(iii) finding a first curve point which divides said transformed corresponding section curve internally into a ratio a:b;

(iv) computing an angle defined by the second pont, the first point and the point of intersection;

(v) computing a second curve point obtained by rotating by the angle a third curve point which divides a line segment defined by the first point and the first curve point externally into the ratio L1:L2;

(vi) generating the untransformed intermediate section curve in said predetermined planar coordinate system by finding a plurality of second curve points by changing the ratio a:b; and (vii) transforming said untransformed intermediate section curve in said predetermined planar coordinate system into the intermediate section curve in said intermediate section.

23. A method of machining a curved surface of a three-dimensional body on a workpiece using a digital computer, comprising the steps of:

(a) inputting, into said computer, section data relating to a section of the body, and data relating to first and second reference sections which contain first and second reference curves specifying the external form of the body and contain first and second points, respectively, lying on a section curve in said section;

(b) specifying a plurality of given sections of said three-dimensional body in accordance with said data;

(c) dividing said first reference curve into a plurality of segments at dividing points;

(d) computing an equation for a transformation from a specific coordinate system to obtain an intermediate section which contains a one of the dividing points on said first reference curve and which contains a straight line lying perpendicular to said first reference section, and a point of intersection of said intermediate section and said second reference curve;

(e) computing an intermediate section curve in said intermediate section on the basis of data relating to said section curve in said section and on the basis of information relating to the positions of the one of said dividing points and said point of intersection;

(f) computing intermediate section curve data relating to said intermediate section curves of a plurality of intermediate sections containing said dividing points;

(g) creating machining data relating to the curved surface of the three-dimensional body on the basis of a plurality of said intermediate section curves;

(h) generating blocks of control data based on said machining data;

(i) transferring said control data to a machine; and (j) controlling the machine to produce said curved surface of said three-dimensional body on the workpiece on the basis of the transferred control data.

24. A method according to claim 23, wherein step (b) comprises the steps of:

(i) dividing said first reference curve internally into a ratio m:n; and (ii) generating said dividing points by changing the ratio m:n.

25. A method according to claim 24, wherein step (b) comprises the steps of:

(i) transforming said section curve, said point of intersection and the one of said dividing points into a corresponding section curve and corresponding points in a predetermined planar coordinate system to bring into coincidence the first point and the one of said dividing points of said intermediate section and said first reference curve, and to bring into coincidence the line of intersection of said section and a reference section and the line of intersection of said intermediate section and said reference section;

(ii) computing a ratio L1:L2, where L1 is the length of a line segment connecting the first point and the second point of the section curve transformed into the corresponding section curve in said predetermined planar coordinate system, and where L2 is the length of a line segment connecting the one of said dividing points and said point of intersection transformed into points in said predetermined planar coordinate system;

(iii) finding a first curve point which divides said transformed corresponding section curve internally into a ratio a:b;

(iv) computing an angle defined by the second points, the first point and the point of intersection;

(v) computing a second curve point obtained by rotating by the angle a third curve point which divides a line segment defined by the first point and the first curve point externally into the ratio L1:L2;

(vi) generating an untransformed intermediate section curve in said predetermined planar coordinate system by finding a plurality of second curve points by changing the ratio a:b; and (vii) transforming said untransformed intermediate section curve in said predetermined planar coordinate system into the intermediate section curve in said intermediate section.

26. A method of machining a curved surface of a three-dimensional body on a workpiece using a digital computer, comprising the steps of:

(a) inputting, into said computer, section data relating to a section of the body, and data relating to first and second reference sections which contain first and second reference curves specifying the external form of the body and contain first and second points, respectively, lying on a section curve in said section;

(b) specifying a plurality of given sections of said three-dimensional body in accordance with said body;

(c) dividing said first reference curve into a plurality of segments at dividing points;

(d) computing an equation for a transformation from a specific coordinate system to obtain an intermediate section which contains a one of the dividing points and a corresponding dividing point on said first and second reference curves, respectively, and which contains a point of intersection of said first reference section and a perpendicular from the corresponding point to said first reference section;

(e) computing data relating to an intermediate section curve on the basis of data relating to said section curve in said section and on the basis of data relating to the one of said dividing points and said corresponding dividing points;

(f) computing intermediate section curve data relating to said intermediate section curves of a plurality of intermediate sections containing said dividing points;

(g) creating machining data relating to the curved surface of the three-dimensional body on the basis of a plurality of said intermediate section curves;

(h) generating blocks of control data based on said machining data;

(i) transferring said control data to a machine; and (j) controlling the machine to produce said curved surface of said three-dimensional body on the work-piece on the basis of the transferred control data.

27. A method according to claim 26, wherein step (d) comprises the steps of:

(i) transforming said section curve, the one of the dividing points and said corresponding dividing point into a corresponding section curve and corresponding points in a predetermined coordinate system to bring into coincidence the first point and the one of the dividing points of said intermediate section and said first reference curve, and to bring into coincidence the line of intersection of said section and a reference section and the line of intersection of said intermediate section and said reference section;

(ii) computing a ratio L1:L2, where L1 is the length of a line segment connecting the first point and second point of the corresponding section curve transformed into the curve in said predetermined planar coordinate system, and where L2 is the length of a line segment connecting the one of said dividing points and the corresponding dividing point transformed into points in said predetermined planar coordinate system;

(iii) finding a first curve point which divides said transformed corresponding section curve internally into a ratio a:b;

(iv) computing an angle defined by the second point, the first point and the corresponding dividing point;

(v) computing a second curve point obtained by rotating by the angle a third curve point which divides a line segment defined by the first point and the first curve point externally into the ratio L1:L2;

(vi) generating an untransformed section curve in said predetermined planar coordinate system by finding a plurality of second curve points by changing the ratio a:b; and (vii) transforming said untransformed intermediate section curve in said predetermined planar coordinate system into the intermediate section curve in said intermediate section.

28. A method of machining a curved surface of a three-dimensional body on a workpiece using a digital computer, comprising the steps of:

(a) inputting, into said computer, data relating to two mutually parallel sections of the body, and data relating to first and second reference sections which contain first and second reference curves, respectively, specifying the external form of the body, said first reference curve connecting the first and second points, and said second reference curve connecting third and fourth points, wherein the first and third points lie on a section curve in one of said two mutually parallel sections and the second and fourth points lie on a section curve in the other of said two mutually parallel sections;

(b) specifying a plurality of given sections of said three-dimensional body in accordance with said data;

(c) dividing said first reference curve internally into a ratio m:n at a dividing point;

(d) computing an equation for a transformation from a specific coordinate system to obtain an intermediate section which contains said dividing point lying on said first reference curve, and which lies in parallel with said section, and a point of intersection of said intermediate section and said second reference curve;

(e) computing data relating to an intermediate section curve on the basis of data relating to the section curves in respective ones of said sections and on the basis of data relating to the positions of the dividing point and said points of intersection;

(f) computing intermediate section curve data relating to intermediate section curves of a plurality of intermediate sections containing said dividing points;

(g) creating machining data relating to the curved surface of the three-dimensional body on the basis of a plurality of said intermediate section curves;

(h) generating blocks of control data based on said machining data;

(i) transferring said control data to a machine; and (j) controlling the machine to produce said curved surface of said three-dimensional body on the workpiece on the basis of the transferred control data.

29. A method according to claim 28, wherein step (e) comprises the steps of:
(i) transforming each of said section curves, said dividing point and said point of intersection of the intermediate section and said first and second reference curves into a corresponding section curve, and corresponding points in a predetermined planar coordinate system, to bring into coincidence the first and second points of said first reference curve and each of said sections and said dividing point, and to bring into coincidence lines of intersection of said first reference section and each of said sections and a line of intersection of said intermediate section and said first reference section;
(ii) computing an intermediate point by internally dividing into a ratio a:b each of said corresponding section curves transformed into said predetermined planar coordinate system, the dividing by the ratio a:b designating fifth and sixth points, and dividing internally into the ratio m:n a straight line connecting the fifth and sixth points at which said section curves are internally divided into the ratio a:b, the straight line dividing designating the intermediate point;
(iii) generating a temporary intermediate section curve comprising intermediate points by finding a number of intermediate points by changing the ratio a:b and containing a temporary intermediate section curve end point;
(iv) computing a ratio L1:L2, where L1 is the length of a line segment connecting the first point and the third point and where L2 is the length of a line segment connecting said dividing point and the point of intersection transformed into points in said predetermined planar coordinate system;
(v) finding a first curve point which divides said temporary intermediate section curve into a ratio c:d;
(vi) computing an angle defined by the temporary intermediate section curve end point, the first point and the point of intersection;
(vii) computing a second curve point obtained by rotating by the angle a third curve point which divides a line segment defined by the first point and the first curve point externally into the ratio L1:L2;
(viii) generating an untransformed intermediate section curve in said predetermined planar coordinate system by finding a number of second curve points by changing the dividing ratio c:d; and
(ix) transforming said untransformed intermediate section curve in said predetermined planar coordinate system into the intermediate section curve in said intermediate section.

30. A method of machining a curved surface of a three-dimensional body on a workpiece using a digital computer, comprising the steps of:
(a) inputting, into said computer, section data relating to two sections of the body, and data relating to first and second reference sections which contain first and second reference curves, respectively, specifying the external form of body, said first reference curve connecting first and second points, said second reference curve connecting third and fourth points, where the first and third points lie on a section curve in one of said two sections and the second and fourth points lie on a section curve in the other of said two sections;
(b) specifying a plurality of given sections of the body in accordance with said data;
(c) dividing said first reference curve internally into a ratio m:n at a dividing point;
(d) computing an equation for a transformation from a specific coordinate system to obtain an intermediate section which contains said dividing point lying on said first reference curve and which is perpendicular to said first reference section and to said first reference curve, and a point of intersection of said intermediate section and said second reference curve;
(e) computing data relating to an intermediate section curve on the basis of data relating to said section curves in respective ones of said sections and on the basis of data relating to the positions of said dividing point and said point of intersection;
(f) computing intermediate section curve data relating to said intermediate section curves of a plurality of intermediate sections containing said dividing points;
(g) creating machining data relating to the curved surface of the three-dimensional body on the basis of a plurality of said intermediate section curves;
(h) generating blocks of control data based on said machining data;
(i) transferring said control data to a machine; and
(j) controlling the machine to produce said curved surface of said three-dimensional body on the workpiece on the basis of the transferred control data.

31. A method according to claim 30, wherein step (e) comprises the steps of:
(i) transforming each of said section curves, said dividing point and said point of intersection into a corresponding section curve and corresponding points in a predetermined planar coordinate system to bring into coincidence the first and third points, and said dividing point of said first reference curve, and to bring into coincidence lines of intersection of said first reference section and each of said sections and a line of intersection of said intermediate section and said first reference section;
(ii) computing an intermediate point by internally dividing into a ratio a:b each of said corresponding section curves transformed into said predetermined planar coordinate system, the dividing at the ratio a:b designating fifth and sixth points, and dividing internally into a ratio m:n a straight line connecting the fifth and sixth points at which said section curves are internally divided into the ratio a:b, the straight line dividing designating the intermediate point;
(iii) generating a temporary intermediate section curve comprising intermediate points by finding a number of intermediate points by changing said internal dividing ratio a:b and containing a temporary intermediate section curve end point;
(iv) computing a ratio L1:L2, where L1 is the length of a line segment connecting the first point and the third point and where L2 is the length of a line segment connecting the one of said dividing points and said point of intersection transformed into points in said predetermined planar coordinate system;
(v) finding a first curve point which divides said temporary intermediate section curve into a ratio c:d;

(vi) computing an angle defined by the temporary intermediate section curve end point, the first point and said point of intersection;

(vii) computing a second curve point obtained by rotating by the angle a third curve which divides a line segment defined by the first point and the first curve point externally into the ratio L1:L2;

(viii) generating an untransformed intermediate section curve in said predetermined planar coordinate system by finding a number of second curve points by changing the ratio c:d; and (ix) transforming said untransformed intermediate section curve in said predetermined planar coordinate system into the intermediate section curve in said intermediate section.

32. A method of machining a curved surface of a three-dimensional body on a workpiece using a digital computer, comprising the steps of:

(a) inputting, into said computer, data relating to two sections of the body, and data relating to first and second reference sections which contain first and second reference curves, respectively, that specify the external form of the body, said first reference curve connecting first and second points, said second reference curve connecting third and fourth points, wherein the first and third points lie on a section curve in one of said two sections and the second and fourth points lie on a section curve in the other of said two sections;

(b) specifying a plurality of given sections of the body in accordance with said data;

(c) dividing said first reference curve internally into a ratio of m:n at a dividing point;

(d) computing an equation for a transformation from a specific coordinate system to obtain an intermediate section which contains said dividing point lying on said first reference curve and which contains a straight line lying perpendicular to said first reference section, and a point of intersection of said intermediate section and said second reference curve;

(e) computing data relating to an intermediate section curve on the basis of data relating to said section curves in respective ones of said sections and on the basis of data relating to the positions of said dividing point and said point of intersection;

(f) computing intermediate section curve data relating to said intermediate section curves of a plurality of intermediate sections containing said dividing points;

(g) creating machining data relating to the curved surface of the three-dimensional body on the basis of a plurality of intermediate section curves;

(h) generating blocks of control data based on said machining data;

(i) transferring said control data to a machine; and (j) controlling the machine to produce said curved surface of said three-dimensional body on the workpiece on the basis of the transferred control data.

33. A method according to claim 32, wherein step (e) comprises the steps of:

(i) transforming each of said section curves, said dividing point and said point of intersection into a corresponding section curve, and corresponding points in a predetermined planar coordinate system to bring into coincidence the first and third points, and said dividing point of said first reference curve, and to bring into coincidence lines of intersection of said first reference section and each of said sections and a line of intersection of said intermediate section and said first reference section;

(ii) computing an intermediate point by internally dividing into a ratio a:b each of said corresponding section curves transformed into said predetermined planar coordinate system, the dividing at the ratio a:b designating fifth and sixth points, and dividing internally into a ratio of m:n a straight line connecting the fifth and sixth points at which said section curves are internally divided into the ratio a:b, the straight line dividing designating the intermediate point;

(iii) generating a temporary intermediate section curve comprising intermediate points by finding a number of intermediate points by changing the ratio a:b and containing a temporary intermediate section curve end point;

(iv) computing a ratio L1:L2, where L1 is the length of a line segment connecting the first point and the third point and where L2 is the length of a line segment connecting said dividing point and said point of intersection transformed into points in said predetermined planar coordinate system;

(v) finding a first curve point which divides said temporary intermediate section curve into a ratio c:d;

(vi) computing an angle defined by said temporary intermediate section curve end point, the first point and said point of intersection;

(vii) computing a second curve point obtained by rotating by the angle a third curve point which divides a line segment defined by the first point and the first curve point externally into the ratio L1:L2;

(viii) generating an untransformed intermediate section curve in said predetermined planar coordinate system by finding a number of second curve points by changing the ratio c:d; and (ix) transforming said untransformed intermediate section curve in said predetermined planar coordinate system into the intermediate section curve in said intermediate section.

34. A method of machining a curved surface of a three-dimensional body on a workpiece using a digital computer, comprising the steps of:

(a) inputting, into said computer, data relating to two sections of the body, and data relating to first and second reference sections which contain first and second reference curves, respectively, that specify the external form of the body, said first reference curve connecting first and second points, said second reference curve connecting third and fourth points, where the first and third points lie on a section curve in one of said two sections and the second and fourth points lie on a section curve in the other of said two sections;

(b) specifying a plurality of given sections of the body in accordance with said data;

(c) dividing said first and second reference curves internally into a ratio m:n at first and second dividing points;

(d) computing an equation for a transformation from a specific coordinate system to obtain an intermediate section which contains the first and second dividing points of said first and second reference curves, respectively, and which contains a point of intersection of said first reference section and a perpendicular from the second dividing point on said first reference section;

(e) computing data relating to an intermediate section curve on the basis of data relating to said section curves in respective ones of said sections and on the basis of the ratio m:n;

(f) computing intermediate section curve data relating to an intermediate section curve in each of a plurality of intermediate sections by the ratio m:n;

(g) creating machining data relating to the curved surface of the three-dimensional body on the basis of a plurality of said intermediate section curves;

(h) generating blocks of control data based on said machining data;

(i) transferring said control data to a machine; and (j) controlling the machine to produce said curved surface of said three-dimensional body on the workpiece on the basis of the transferred control data.

35. A method according to claim 34, wherein step (e) comprises the steps of:

(i) transforming each of said section curves and the first and second dividing points of said first and second reference curves into corresponding section curves and corresponding points in a predetermined planar coordinate system to bring into coincidence the first and second points of said first reference curve and each of said sections and said first dividing point of said first reference curve, and to bring into coincidence lines of intersection of said first reference section and each of said sections and a line of intersection of said intermediate section and said first reference section;

(ii) computing intermediate points by internally dividing into a ratio a:b each of said corresponding section curves transformed into said predetermined planar coordinate system, the dividing at the ratio a:b designating fifth and sixth points for each of said section curves, and dividing internally into a ratio of m:n the straight line connecting the fifth and sixth points at which said section curves are internally divided into a ratio a:b, said straight line dividing designating an intermediate point for each said curve;

(iii) generating a temporary intermediate section curve for each section comprising respective intermediate points by finding a number of respective intermediate points by changing the ratio a:b and each section curve having a temporary intermediate section curve end point;

(iv) computing ratio L1:L2 for each intermediate section, where L1 is the length of a line segment connecting the first point and the third point, and where L2 is the length of a line segment connecting said first and second dividing points transformed into points in said predetermined planar coordinate system;

(v) finding first a curve point for each intermediate section which divides said temporary intermediate section curve into a ratio c:d;

(vi) computing an angle for each intermediate section defined by said temporary intermediate section curve end point, the first point and said second dividing point;

(vii) computing a second curve point for each intermediate section obtained by rotating by the angle a third curve point which divides a line segment defined by the first point and the first curve point externally into the ratio L1:L2;

(viii) generating untransformed intermediate section curves for each intermediate section in said predetermined planar coordinate system by finding a number of respective second curve points by changing the ratio c:d; and (ix) transforming said untransformed intermediate section curves in said predetermined planar coordinate system into the intermediate section curves in said intermediate sections.

36. A method of machining a curved surface of a three-dimensional body on a workpiece using section curves in given sections that define the shape of the body at different section lines, the method using a computer and comprising the steps of:

(a) inputting given section data defining the two given sections and given section curve data defining the two corresponding given section curves;

(b) defining intermediate sections that insure a machined surface between the given sections;

(c) generating intermediate section curve data for each of the defined intermediate sections;

(d) generating blocks of control data based on the intermediate section curve data;

(e) transferring said control data to a machine; and (f) controlling the machine to produce said curved surface of said three-dimensional body on the workpiece on the basis of the transferred control data.

37. A method according to claim 36, wherein step (e) comprises the steps of creating a numerical control tape based on the intermediate section curve data.

38. A method according to claim 36, wherein step (b) comprises the step of:

(i) defining intermediate sections parallel with the given sections.

39. A method according to claim 38, wherein the given section data includes data defining the plane of the given section, and wherein step (i) comprises the steps of:

(1) inputting reference section data for a reference section which passes through the two given sections and reference curve data for a reference curve defining the external shape of the body having end points corresponding to one of the end points of each of the given curves;

(2) dividing the reference curve by a ratio m:n to define a dividing point, the dividing point lying in the intermediate section;

(3) transforming the section data for one of the given sections into intermediate section data by translating the data defining the plane, where the translated plane passes through the dividing point; and (4) repeating steps (2) and (3) a plurality of times by varying the ratio m:n by an increment which insures the machined surface between the given sections.

40. A method according to claim 36, wherein step (b) comprises the steps of:

(i) inputting reference section data for a reference section which passes through the given sections and reference curve data for a reference curve, where the reference curve data defines the external shape of the body; and (ii) defining intermediate sections perpendicular to the reference curve and contacting the reference curve.

41. A method according to claim 40, wherein the given section data includes data defining the plane of the given section, and wherein said step (ii) comprises the steps of:
 (1) dividing the reference curve by a ratio m:n to define a dividing point, the dividing point lying in one of the intermediate sections;
 (2) defining a normal line passing through the reference curve and the dividing point;
 (3) transforming the section data for one of the given sections into intermediate section data by translating the data defining the plane, where the translated plane passes through the normal and the reference section; and
 (4) repeating steps 1-3 a plurality of times by varying the ratio m:n by an increment which insures the machined surface between the given sections.

42. A method according to claim 36, wherein step (b) comprises the steps of:
 (i) inputting reference section data for a reference section which passes through the given sections and reference curve data for a reference curve having end points corresponding to one of the end points of each of the given curves;
 (ii) defining an axis perpendicular to the reference section; and
 (iii) defining intermediate sections radiating from the axis.

43. A method according to claim 42, wherein the given section data includes data defining the plane of the given section, and wherein step (iii) comprises the steps of:
 (1) dividing the reference curve by a ratio m:n to define a dividing point, the dividing point lying in the reference section;
 (2) transforming the section data for one of the given sections into intermediate section data by translating the data defining the plane, where the translated plane passes through the dividing point and the axis; and
 (3) repeating steps (1) and (2) a plurality of times by varying the ratio m:n by an increment which insures the machined surface between given sections.

44. A method according to claim 36, wherein step (b) comprises the steps of:
 (i) inputting reference section data for two reference sections and reference curve data for two reference curves in the reference sections having end points corresponding to one of the end points of each of the given curves; and
 (ii) defining intermediate sections perpendicular to one of the two reference sections and contacting the corresponding section curve.

45. A method according to claim 44, wherein the given section data includes data defining the plane of the given section, and wherein step (ii) comprises the steps of:
 (1) dividing the two reference curves by a ratio m:n to define respective reference curve dividing points, the reference curve dividing points lying in the intermediate section;
 (2) defining a perpendicular line from one of the reference sections which passes through the dividing point of the other of the reference sections;
 (3) transforming the section data for one of the given sections into intermediate section data by translating the data defining the plane where the translated plane passes through the perpendicular line and the two dividing points; and
 (4) repeating steps 1-3 a plurality of times by varying the ratio by an increment which insures the machined surface between the given sections.

46. A method according to claim 39, 41, 43 or 45, wherein step (c) comprises the steps of:
 (I) transforming the given sections and given section curves onto the same plane where the end points coincide;
 (II) dividing the two given curves by a ratio a:b to define respective given curve dividing points;
 (III) dividing a straight line connecting the given curve dividing points by the ratio m:n;
 (IV) repeating steps (II) and (III) a plurality of times by changing the ratio a:b by a curve increment to create an intermediate section curve; and
 (V) transforming the intermediate section curve into intermediate section curve data.

47. A method according to claims 45, wherein step (c) comprises the steps of:
 (I) transforming one of the given section curves and reference curve dividing points into the same plane where one of the reference curve dividing points and one of the end points of the given curve coincide;
 (II) determining a ratio L1:L2, where L1 is the length of a first straight line connecting the end points of the given section curve and L2 is the length of a second straight line connecting the reference curve dividing points;
 (III) determining an angle between the first and second straight lines;
 (IV) dividing the given curve by a ratio a:b to define a given curve dividing point;
 (V) determining a translated and rotated point by rotating the given curve dividing point by the angle and translating the given point based on the ratio L1:L2, the translated and rotated point lying on the intermediate section curve;
 (VI) repeating steps (IV) and (V) a plurality of times by changing the ratio a:b by a curve increment to create the intermediate section curve; and
 (VIII) transforming the intermediate section curve into intermediate section curve data.

48. A method according to claim 45, wherein step (c) comprises the steps of:
 (I) transforming the given section curves and the reference curve dividing points into the same plane where the corresponding end points of the given curves and the corresponding reference curve dividing point coincide;
 (II) dividing the given curves by a ratio a:b to define respective given curve dividing points;
 (III) dividing a straight line connecting the given curve dividing points by the ratio m:n;
 (IV) repeating steps (II) and (III) a plurality of times by changing the ratio a:b by a curve increment to create a temporary intermediate curve having an end point;
 (V) determining a ratio L1:L2 where L1 is the length of a first straight line connecting the end points of the temporary intermediate curve and L2 is the length of a second straight line connecting the reference curve dividing points;
 (VI) determining an angle between the first and second straight lines;

(VII) dividing the temporary intermediate curve by a ratio c:d to define a temporary curve dividing point;
(VIII) determining a translated and rotated point by rotating the temporary curve dividing point by the angle and translating the temporary curve dividing point based on the ratio L1:L2;
(IX) repeating steps (VII) and (VIII) a plurality of times by changing the ratio c:d by a final curve increment to create the intermediate section curve; and
(X) transforming the intermediate section curve into intermediate section curve data.

* * * * *

UNITED STATES PATENT AND TRADEMARK OFFICE
CERTIFICATE OF CORRECTION

PATENT NO. : 4,569,014
DATED : February 4, 1986
INVENTOR(S) : HAJIMU KISHI ET AL.

It is certified that error appears in the above-identified patent and that said Letters Patent is hereby corrected as shown below:

Col. 1, line 42, "largescale" should be --large scale--.

Col, 2, line 10, "a" should be --an--.

Col. 6, line 39, "K = 1" should be --k = 1--.

Col. 7, line 6, "a" should be --ⓐ--;

line 16, "b" should be --ⓑ--;

line 20, "a and b" should be --ⓐ and ⓑ--.

Col. 8, line 28, "transmission" should be --transformation--.

Col. 9, line 11, "12," should be --12 and--;

line 60, "obtaind" should be --obtained--.

Col. 10, line 63, "transforming" should be --transformation--.

Col. 12, line 27, "a" should be --an--;

line 31, "method" should be --Method--;

"intermediate-section" should be

--intermediate section--;

line 39, "II" should be --III--.

UNITED STATES PATENT AND TRADEMARK OFFICE
CERTIFICATE OF CORRECTION

PATENT NO. : 4,569,014

DATED : February 4, 1986

INVENTOR(S) : HAJIMU KISHI ET AL.

It is certified that error appears in the above—identified patent and that said Letters Patent is hereby corrected as shown below:

Col. 13, line 46, "a" should be --an--.

Col. 14, line 4, "II" should be --III--;

line 13, "112A" should be --12A--;

line 55, "tha" should be --that--.

Col. 16, line 18, "findicative" should be --indicative--;

line 44, delete "conceptual";

line 45, delete "conceptual".

Col. 17, line 44, "sectin" should be --section--.

Col. 18, line 18, "bases" should be --basis--.

UNITED STATES PATENT AND TRADEMARK OFFICE
CERTIFICATE OF CORRECTION

PATENT NO. : 4,569,014
DATED : February 4, 1986
INVENTOR(S) : HAJIMU KISHI ET AL.

It is certified that error appears in the above—identified patent and that said Letters Patent is hereby corrected as shown below:

Col. 19, line 57, "whch" should be --which--.

Col. 23, line 37, "sytem" should be --system,--;

line 45, "pont," should be --point,--.

Col. 34, line 20, "claims" should be --claim--.

Signed and Sealed this

Twentieth Day of May 1986

[SEAL]

Attest:

DONALD J. QUIGG

Attesting Officer

Commissioner of Patents and Trademarks